United States Patent [19]
Umeda et al.

[11] 3,797,776
[45] Mar. 19, 1974

[54] AUTOMATIC TAPE LOADING TYPE MAGNETIC RECORDING AND REPRODUCING APPARATUS

[75] Inventors: Hiroyuki Umeda, Yokohama; Shichiro Fukatsu, Chigasaki, both of Japan

[73] Assignee: Victor Company of Japan, Ltd., Tokohama, Japan

[22] Filed: Mar. 4, 1971

[21] Appl. No.: 121,008

[30] Foreign Application Priority Data

Mar. 6, 1970 Japan ............................... 45/18940
Mar. 30, 1970 Japan ............................... 45/41321

[52] U.S. Cl. ............ 242/188, 179/100.2 T, 226/91, 242/74.2, 242/192, 242/195, 242/209, 242/210
[51] Int. Cl. ...................... G11b 15/66, B65h 75/28
[58] Field of Search ........... 242/195, 192, 188, 210, 242/71.8, 74.2, 206, 209, 186, 180, 181; 352/157, 158; 226/91, 92; 179/100.2 T

[56] References Cited

UNITED STATES PATENTS

| | | | |
|---|---|---|---|
| 3,208,682 | 9/1965 | Pastor et al. | 242/195 X |
| 3,254,856 | 6/1966 | Camras | 242/71.8 A X |
| 3,598,926 | 8/1971 | Umeda | 242/195 |

*Primary Examiner*—George F. Mautz

[57] ABSTRACT

An automatic tape loading type magnetic recording and reproducing apparatus comprises means for detecting a leader of a predetermined length fed from a supply reel and stopping the feeding of the leader, an automatic take-up reel for automatically engaging and positively taking up the fed leader, and means for detecting the feeding of a tape following the leader and thereafter positively transporting the succeeding tape.

12 Claims, 25 Drawing Figures

INVENTORS
HIROYUKI UMEDA
SHICHIRO FUKATSU

BY Louis [signature] ATTORNEY

PATENTED MAR 19 1974 3,797,776

SHEET 02 OF 13

INVENTORS
HIROYUKI UMEDA
SHICHIRO FUKATSU

BY [signature] ATTORNEY

INVENTORS
HIROYUKI UMEDA
SHICHIRO FUKATSU

BY [signature] ATTORNEY

INVENTORS
HIROYUKI UMEDA
SHICHIRO FUKATSU

BY
[signature]
ATTORNEY

INVENTORS
HIROYUKI UMEDA
SHICHIRO FUKATSU

BY

ATTORNEY

INVENTORS
HIROYUKI UMEDA
SHICHIRO FUKATSU
BY [signature] ATTORNEY

INVENTORS
HIROYUKI UMEDA
SHICHIRO FUKATSU

BY Louis Bernat ATTORNEY

INVENTORS
HIROYUKI UMEDA
SHICHIRO FUKATSU

BY Louis Bernat
ATTORNEY

INVENTORS
HIROYUKI UMEDA
SHICHIRO FUKATSU

BY Louis Bernat
ATTORNEY

INVENTORS
HIROYUKI UMEDA
SHICHIRO FUKATSU

BY Louis Bernat
ATTORNEY

INVENTORS
HIROYUKI UMEDA
SHICHIRO FUKATSU

BY Louis Bernat
ATTORNEY

INVENTORS
HIROYUKI UMEDA
SHICHIRO FUKATSU

BY [signature]
ATTORNEY

INVENTORS
HIROYUKI UMEDA
SHICHIRO FUKATSU

BY [signature]

ATTORNEY

AUTOMATIC TAPE LOADING TYPE MAGNETIC RECORDING AND REPRODUCING APPARATUS

This invention relates to an automatic tape loading type magnetic and reproducing apparatus and, more particularly, to a magnetic recording and reproducing apparatus for automatically loading a tape member fed from a cartridge and passed through a predetermined path.

Generally, there has been proposed an automatic tape loading type magnetic recording and reproducing apparatus which transports a tape fed from a supply reed, to travel along a predetermined path, and further automatically winds the tape on an automatic take-up reel. The magnetic recording and reproducing apparatus of this kind usually comprises means for feeding and forwarding a tape member such as a tape or tape leader attached at an end of the tape, means for guiding the fed tape member along a predetermined path of tape travel, and an automatic take-up reel for automatically engaging and taking up the guided tape member.

Such conventional automatic tape loading type magnetic recording and reproducing apparatus has been designed in a construction so as to detect the winding of a tape on a take-up reel after the tape is fed from the supply reel and then to effectively stop the winding of tape. Thereafter, the transportation of the tape is performed by means of a capstan and a pinch roller. In this conventional apparatus, the tape or leader fed from the supply reel and guided for travel often are not desirably taken up on the automatic take-up reel due to trouble. Even, in this circumstance, the feeding of the tape or leader is continuously performed. In consequence, the tape or leader is accumulated both inside and outside of the path of travel in the apparatus, resulting in damage to the tape or leader.

Therefore, it is a general object of the present invention to overcome the above disadvantages and provide a novel and useful automatic tape loading type magnetic recording and reproducing apparatus.

Another object of the invention is to provide an apparatus which prevents more than a predetermined length of the leader from being fed, when the automatic take-up reel inadvertently fails to perform its automatic engaging and winding function. Thus, even in the event when the automatic take-up reel does not automatically engage the leader, the leader and the tape are prevented from being fed in more than the desired length whereby the consequent damage is avoided.

A further object of the invention is to provide an apparatus which permits a winding of the leader in a fast taking-up manner. As the result, the leader can be rapidly wound on the take-up reel. The tape can reach the magnetic head portion in the short period of time after the beginning of the auto-threading and the recording or reproducing is, therefore, quickly started.

Still another object of the invention is to provide an apparatus which can securely engage and take up the leader as it is fed from the supply reel and guided along the predetermined travelling path to the automatic take-up reel. The automatic take-up reel is previously stopped at a position where it is able to securely engage the leader.

A still further object of the invention is to provide an apparatus which can smoothly and accurately engage the forward end of the leader by means of the automatic take-up reel.

These and other objects and features of the invention will become apparent from the description set forth hereafter when considered in conjunction with the accompanying drawings, in which.

An embodiment of the apparatus according to this invention will be explained under each item heading:

TAPE CARTRIDGE

Figure 1:
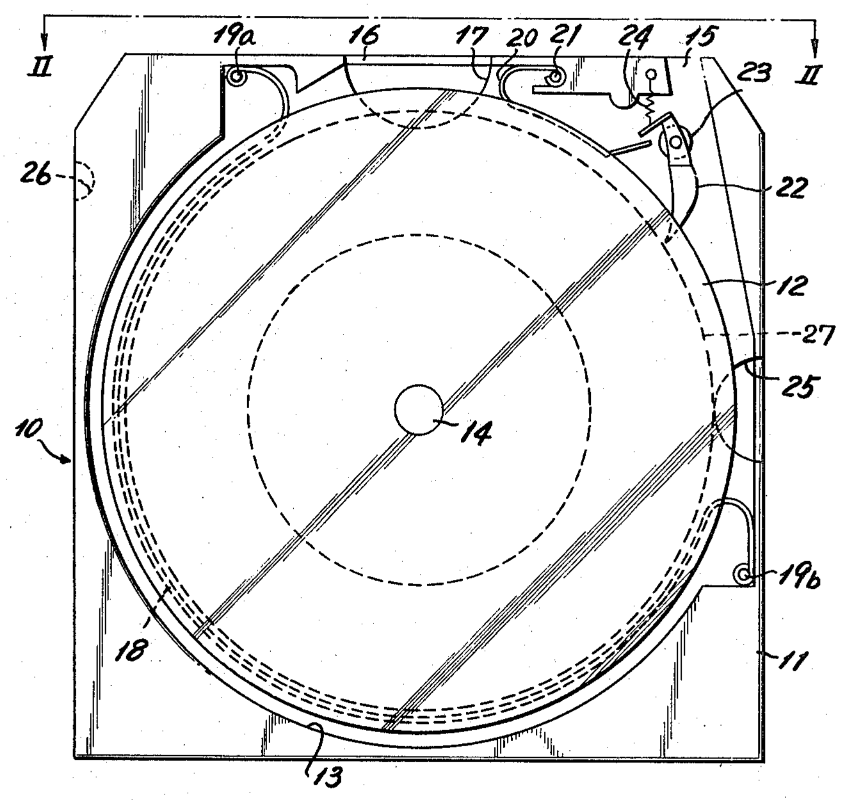
FIG.1 is a plan view of an embodiment of a tape cartridge which can be used in an apparatus according to this invention, an upper cover of the cartridge being taken away in this figure.
Figure 2:
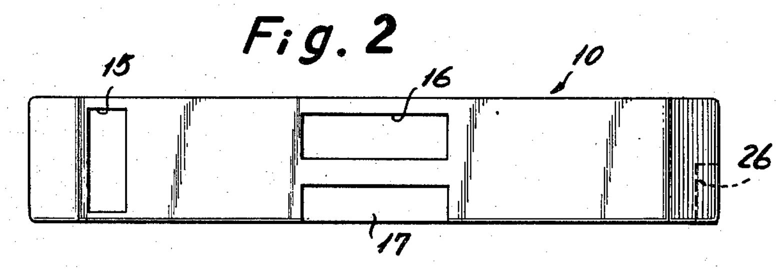
FIG.2 is a front view of the tape cartridge, viewed from the line II—II of FIG.1, the upper cover of the cartridge being attached.

An embodiment of a tape cartridge used in the apparatus of this invention is now illustrated with reference to FIGS.1 and 2. A tape cartridge 10 generally comprises a cartridge casing 11 and a supply reel 12 contained in the casing 11. The supply reel 12 is accommodated in a circular portion 13 provided in the casing 11, said circular portion having a diameter which is larger than that of the reel. The supply reel 12 is positioned to rotate about a center pin 14 in the center of the circular portion 13.

At the front of the casing 10 is a tape feed opening 15, an opening 16 into which a tape feed roller is inserted, and an opening 17 into which a rewinding roller is inserted. The opening 17 extends over the lower cover of the cartridge casing 11, below the opening 16. A tape guide plate 18 is narrower in width than the space between the upper and lower flanges of the reel 12. The plate is fixed with pins 19*a* and 19*b*. The tape guide plate 18 is disposed between the upper and lower flanges of the reel 12. The plate 18 prevents the tape from falling between the circular portion 13 of the casing 11 and the reel 12. A tape guide plate 20 fixed to the casing by a pin 21 and acts in the same manner as the tape guide plate 18.

A guide plate 22 is rotatably mounted on a shaft 23. The guide plate 22 receives the force of a spring 24, held under tension between its end and the casing 11. The tip end of the guide plate 22 makes contact, by a slight force, with the outermost periphery of a tape winding 27 wound on a reel 12 The guide plate 22 revolves clockwise, as seen in the figure, by force of the spring 24 as the tape is unwound, and the diameter of the tape winding 27 is lessened.

An opening 25 is provided between the side board and lower cover of the casing 11. A tension pole (not shown) enters into the cartridge 10 through the opening 25, compresses against the reel flange of the reel 12, and adjusts the rotation speed of the reel 12. A recess 26 allows a locking roller to enter and lock therein when the cartridge 10 is inserted into the apparatus.

Figures 10, 11A, 11B:
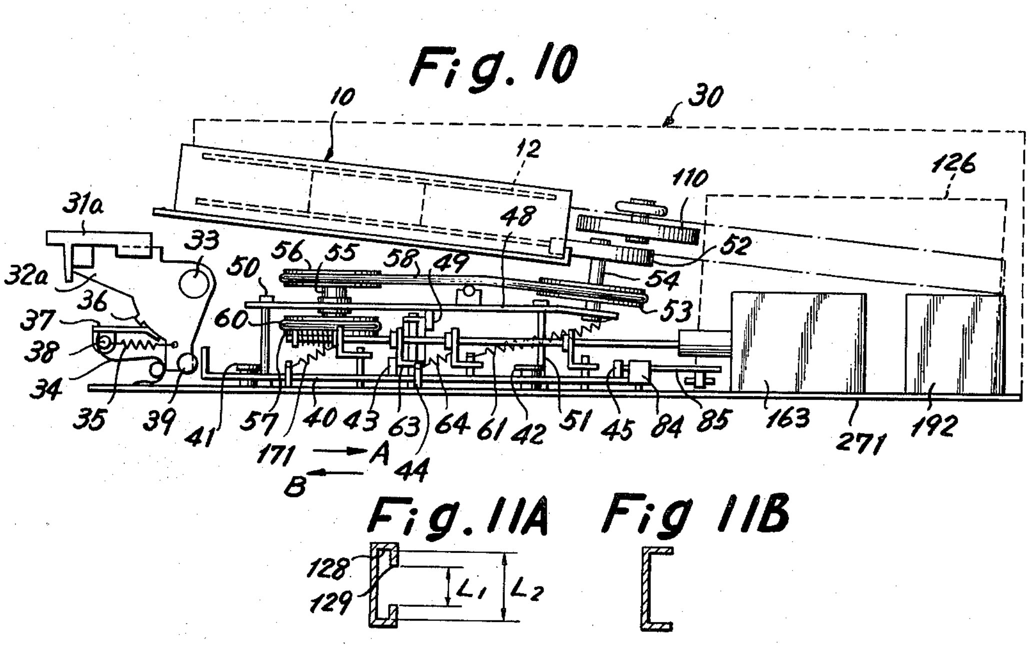
FIG.10 is a vertical sectional view of the mechanism taken along the line X—X of FIG. 5.
FIGS.11A and 11B are vertical sectional views taken along the lines X*Ia*—X*Ia* and X*Ib*—X*Ib* of FIG.3.

The cartridge 10 of the above construction is inserted into a cartridge insertion opening at a fixed position on a magnetic recording and reproducing apparatus 30 as shown in FIG.10. The cartridge 10 is loaded in the apparatus 30 in the state as above described.

TAPE AND TAPE LEADER

Figure 12:
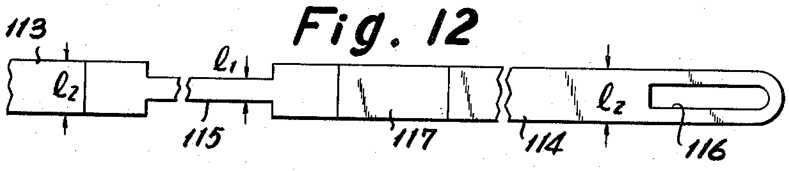
FIG.12 is a plan view of an embodiment of a tape leader.

The tape and tape leader wound on the supply reel 12 in the cartirdge 10 is now described. As shown in FIG.12, a first tape leader 114 and a second tape leader 115 are provided at the forward end of a magnetic tape 113. The first leader 114 is formed of a normally straight, flexible, and transparent material. The leader has the same width $l_2$ as the width $l_2$ of the tape 113. The second leader 115 is provided between the leader 114 and the tape 113. The leader 115 is made of a soft material which does not damage the rotary magnetic head tip when the leader contacts the head tip. A slot 116 is provided at the forward end of the leader 114. A non-transparent light interrupting tape 117 is provided on the first leader 114. The tape 117 may be otherwise provided on the second leader 115 or on both leaders 114 and 115. The action of the tape 117 is described later in detail.

AUTO-THREADING AND AUTO-LOADING

An embodiment of an automatic tape loading type magnetic recording and reproducing apparatus according to this invention is described with respect to each mode. First, an auto-loading mode is now described.

Figure 5:
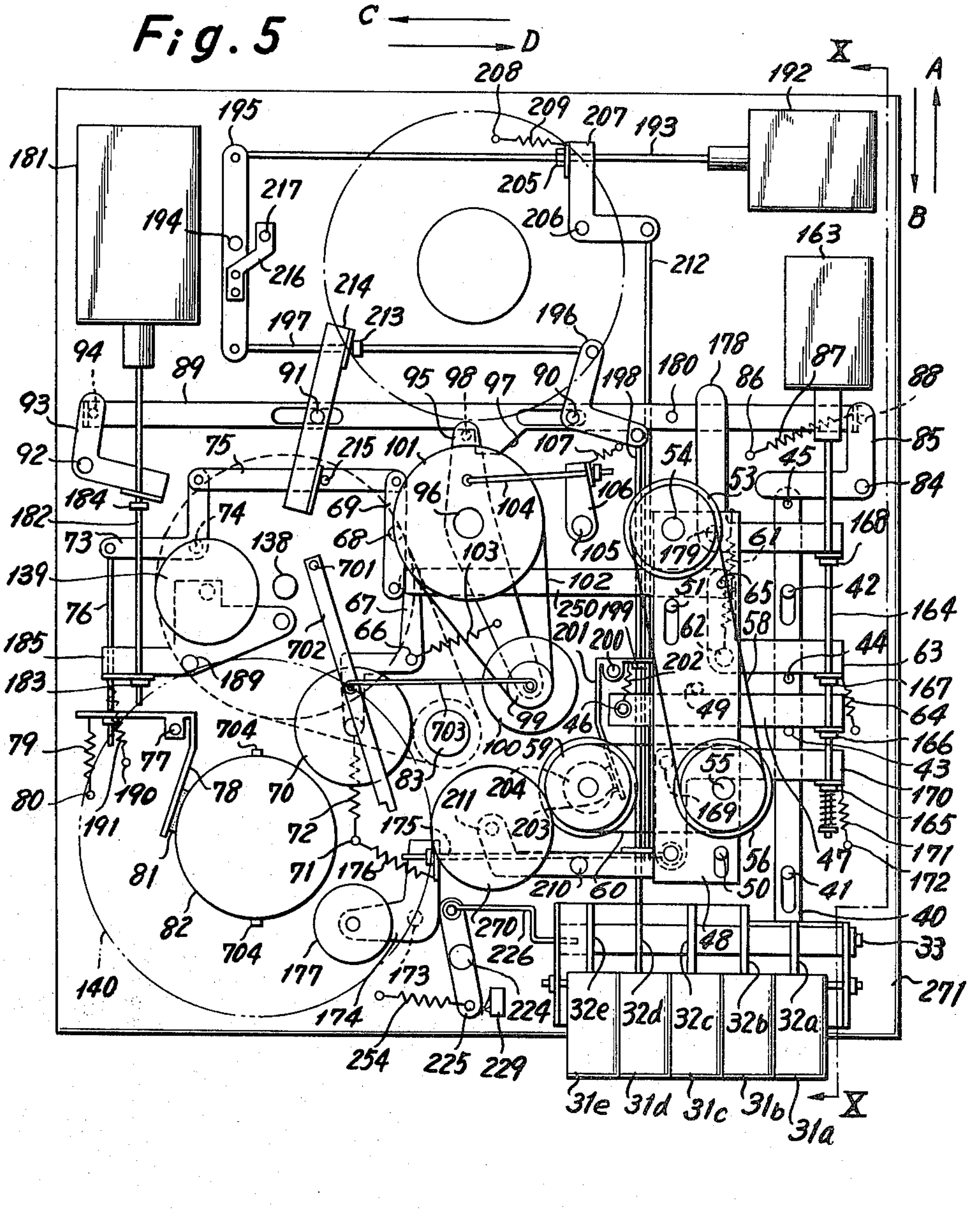
FIG.5 is a plan view of an embodiment of a mechanism of the apparatus shown in FIG.3 in a stop mode.

Each mechanism is in the position as shown in FIG.5, when the apparatus is in the stop mode. A button 31*a* is depressed downwardly to select the tape automatic loading mode, to perform automatic threading of the tape. When the button 31*a* is depressed downwardly, a play lever 32*a* fixed under the button 31*a* revolves counterclockwise, as viewed in the figure, about a shaft 33 fixed on a bracket. At this instant, the lever 32*a* revolves against a force of a spring 35 (FIG.10).

An engaging member 37 is revolvably journaled on a shaft 38 and is biased by a force of a spring 34 in a counterclockwise direction. An end of the engaging member 37 engages the play lever 32*a*. Thus, the engaging member 37 is held in a fixed position. By revolution of the play lever 32*a*, a projection 36 provided on the lever 32*a* similarly revolves so that the engaging member 37 is revolved clockwise. As the play lever 32*a* further revolves, the engaging member 37 is disengaged from the projection 36. The engaging member 37 thereby revolves counterclockwise by force of the spring 35. If the play lever 32*a* revolves to such position, the engaging member 37 engages with the projection 36 of the play lever 32*a*. Therefore, the revolutions of the lever 32*a* and engaging member 37 is mutually restricted. Thus, the play button 31*a* is locked in the depressed position.

By revolution of the play lever 32*a*, a pin 39 on the lever 32*a* pushes a slide lever 40 in the direction of arrow A. As the result, the lever 40 slides in the direction of arrow A (FIGS.5 and 10) guided by guide pins 41 and 42 provided on the chassis 271. Pins 43, 44 and 45 are provided upright on the slide lever 40. As shown in FIGS.5 to 10, the pin 43 engages one side of a revolvable lever 47, which is revolvable about a shaft 46. The other side of the lever 47 engages a pin 49 provided on a lower surface of a slide plate 48.

The slide plate 48 is guided by guide pins 50 and 51 on the chassis 271 to slide in the directions of arrows A and B. The plate 48 has attached thereto a rewinding pulley 53 which is rotatably mounted on a shaft 54, and pulleys 56 and 57 mounted on a shaft 55. The shaft 54 is integrally mounted with a rewinding roller 52. A belt 58 is held between the pulley 53 and the pulley 56. A belt 60 is held between the pulley 57 and a pulley 59. The pulley 59 is rotatably attached to the chassis 271.

The slide plate 48 is always urged, by a spring 61, in the direction of arrow B. In the stop mode, the plate 48 is at a position as shown in FIG.5. By sliding of the slide lever 40 in the arrow A direction, as above described, the pin 43 on the lever 40 also slides in the direction of arrow A. Because of this, the revolvable lever 47, in engagement with the pin 43, revolves counterclockwise about the shaft 46. By the revolution of the lever 47, the slide plate 48 is slidingly moved in the arrow A direction. By a sliding of the plate 48, the rewinding roller 52 (which had previously entered in the cartridge 10 from its opening 17) is moved backward out of the interior of the cartridge 10.

Figure 9:
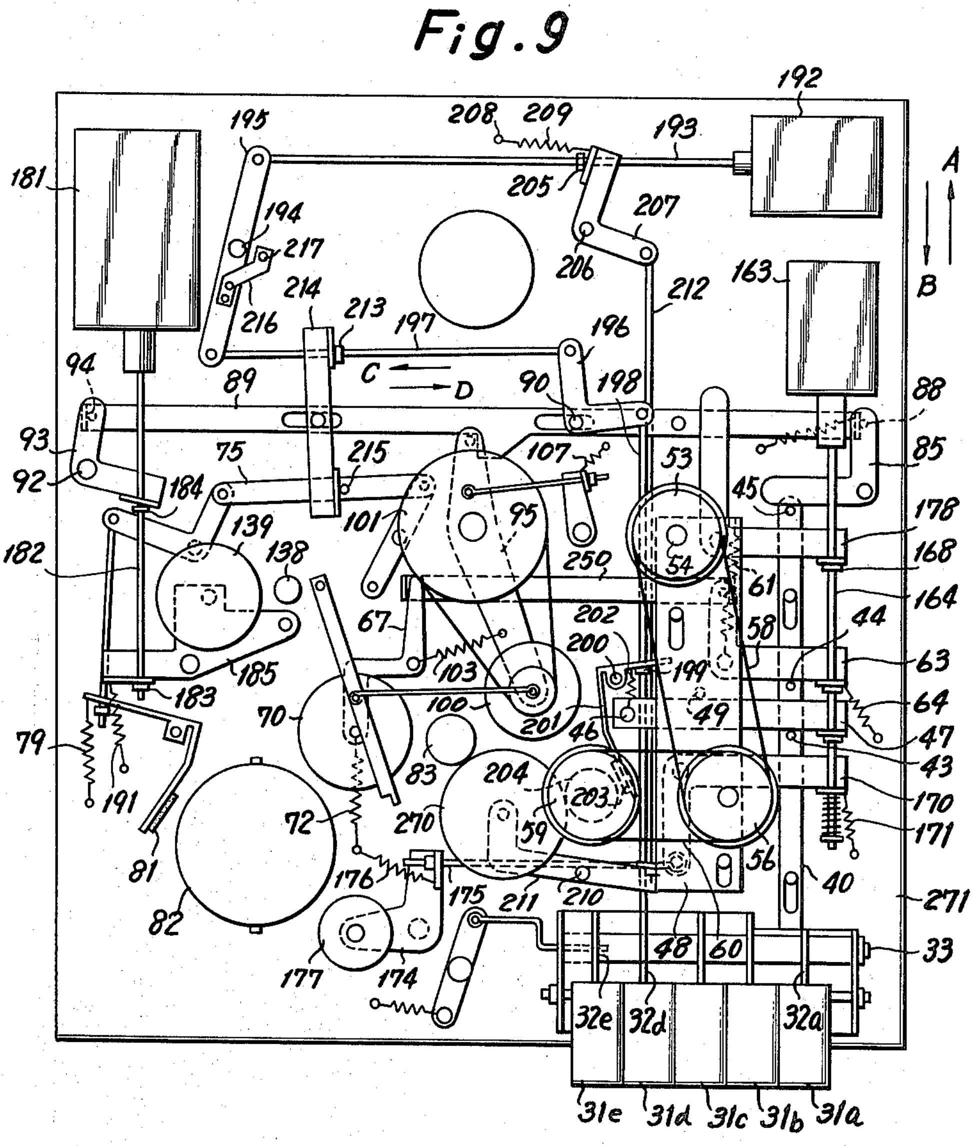

The pin 44 (FIG.5) on the slide lever 40 is engaged with an end of an L-shaped lever 63. The lever 63 is revolvably carried on a shaft 62 and urged in a clockwise direction by a spring 64. An arm 250 is pivotally mounted at the pivot 65 on the other end of the lever 63. The arm 250 can move leftwardly and rightwardly in FIG.5 by known guide means by revolution of the lever 63. The other end of the arm 250 is connected to an end of a swing lever 67, which is revolvable about a shaft 66, and also to an end of a swing lever 69, which is revolvable about a shaft 68. An idler wheel 70 is rotatably mounted at the other end of the swing lever 67. A spring 72 is held between the other end of the lever 67 and a pin 71 on the chassis 271. Although the lever 67 is always urged to revolve counterclockwise by spring 72, when it is in the position as shown in FIGS.5 and 9 it is in engagement with the other end of the arm 250.

An L-shaped lever 73 is pivotally mounted on a shaft 74. One end of the lever 73 is connected with the other end of the swing lever 69, by an arm 75. The revolution of the lever 69 is transmitted to the lever 73 through the arm 75. The lever 73 is connected through a connector 76 to a brake lever 78, which is revolvable about a shaft 77. A spring 79 is held between the one end of the lever 78 and a pin 80 on the chassis 271. A brake shoe 81 is provided on the other end of the lever 78. The brake lever 78 is urged in the counterclockwise direction by the force of the spring 79. Thus, the brake shoe 81 presses against a reel disk 82 on the take-up reel. Therefore, the take-up reel receives a braking force. Here, the tractive force of the spring 72 is selected to be weaker than the sum of the tractive forces of the springs 64 and 79.

Figure 6:
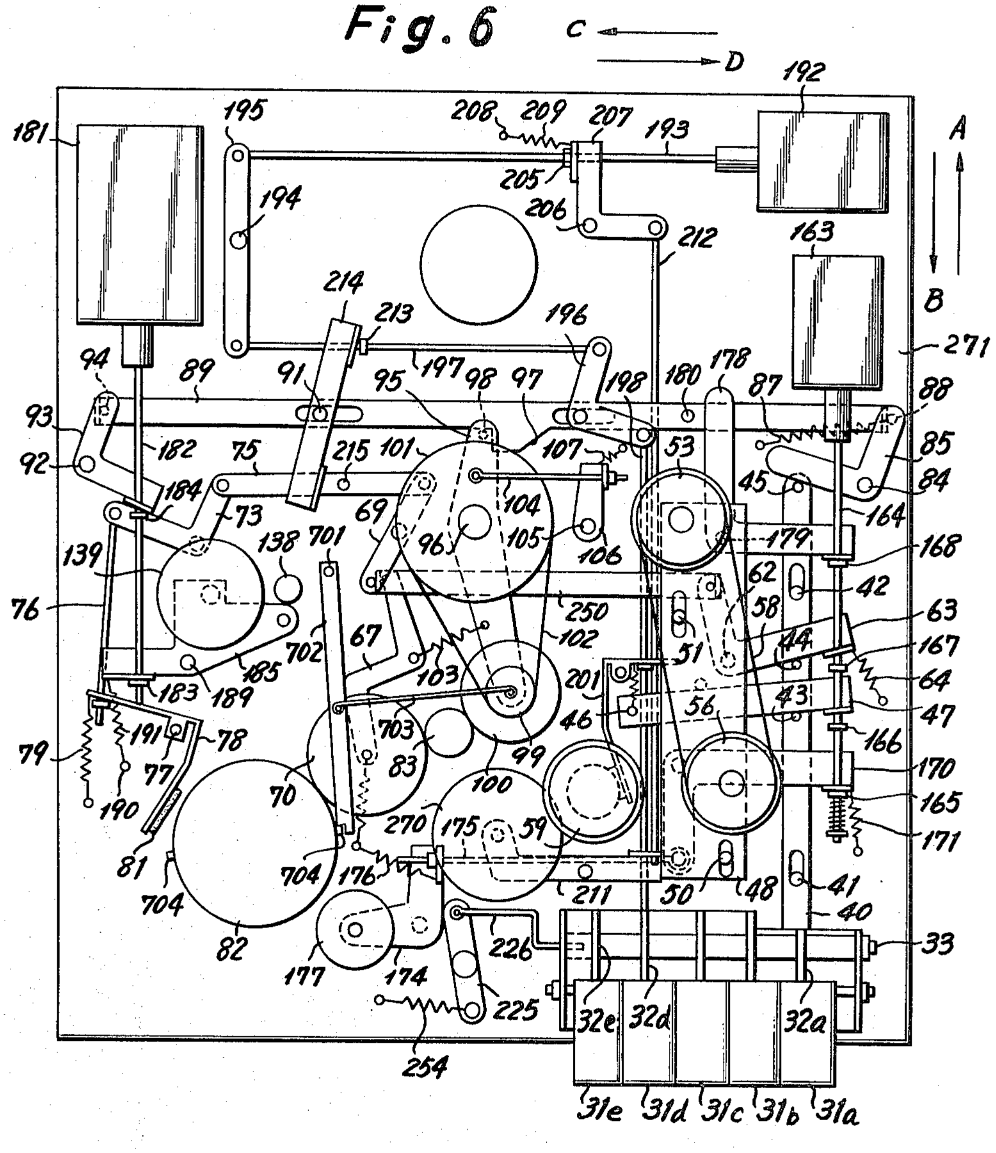
FIGS.6 to 9 are stop motion plan views of an essential portion of the mechanism shown in FIG.5 respectively in a tape automatic loading mode, fast forwarding mode, recording or reproducing mode, and rewinding mode.
Figure 7:
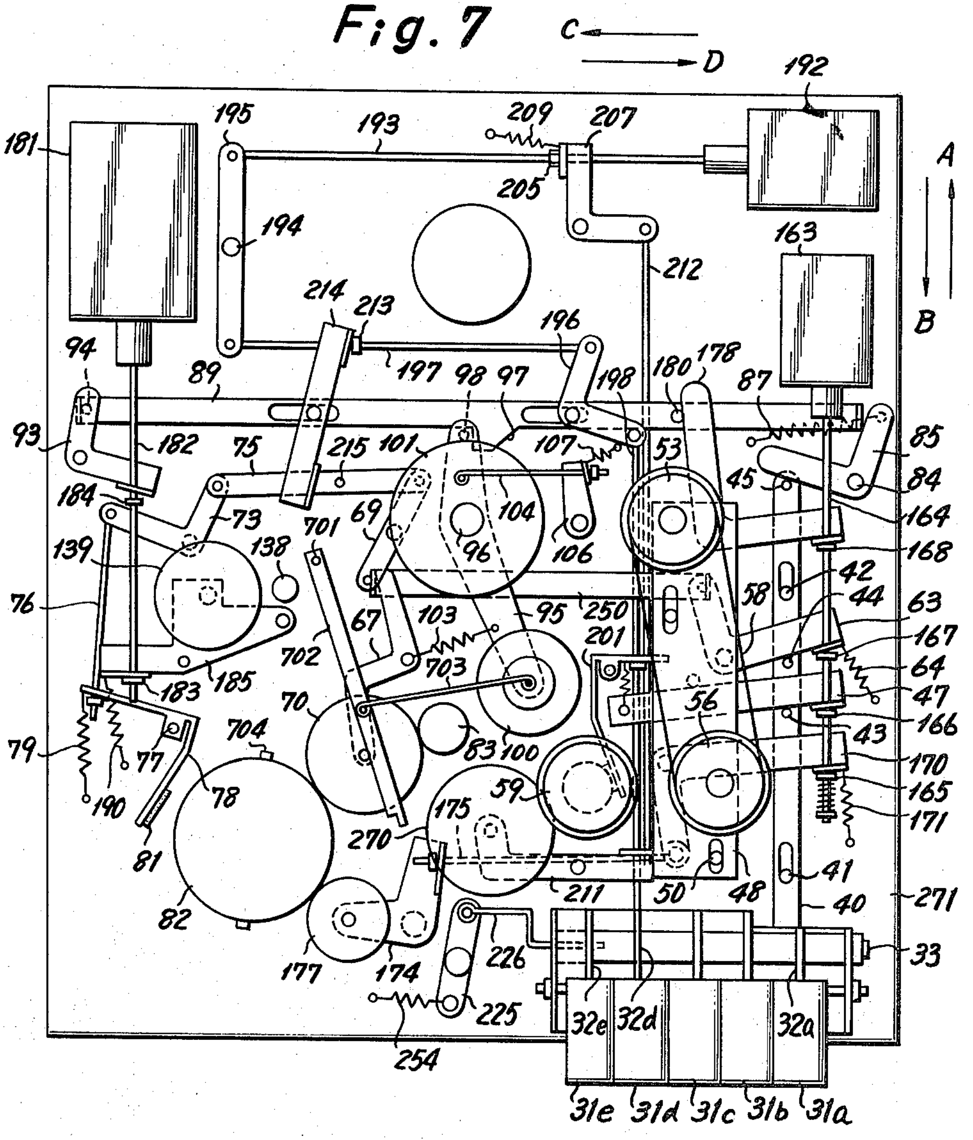
Figure 8:
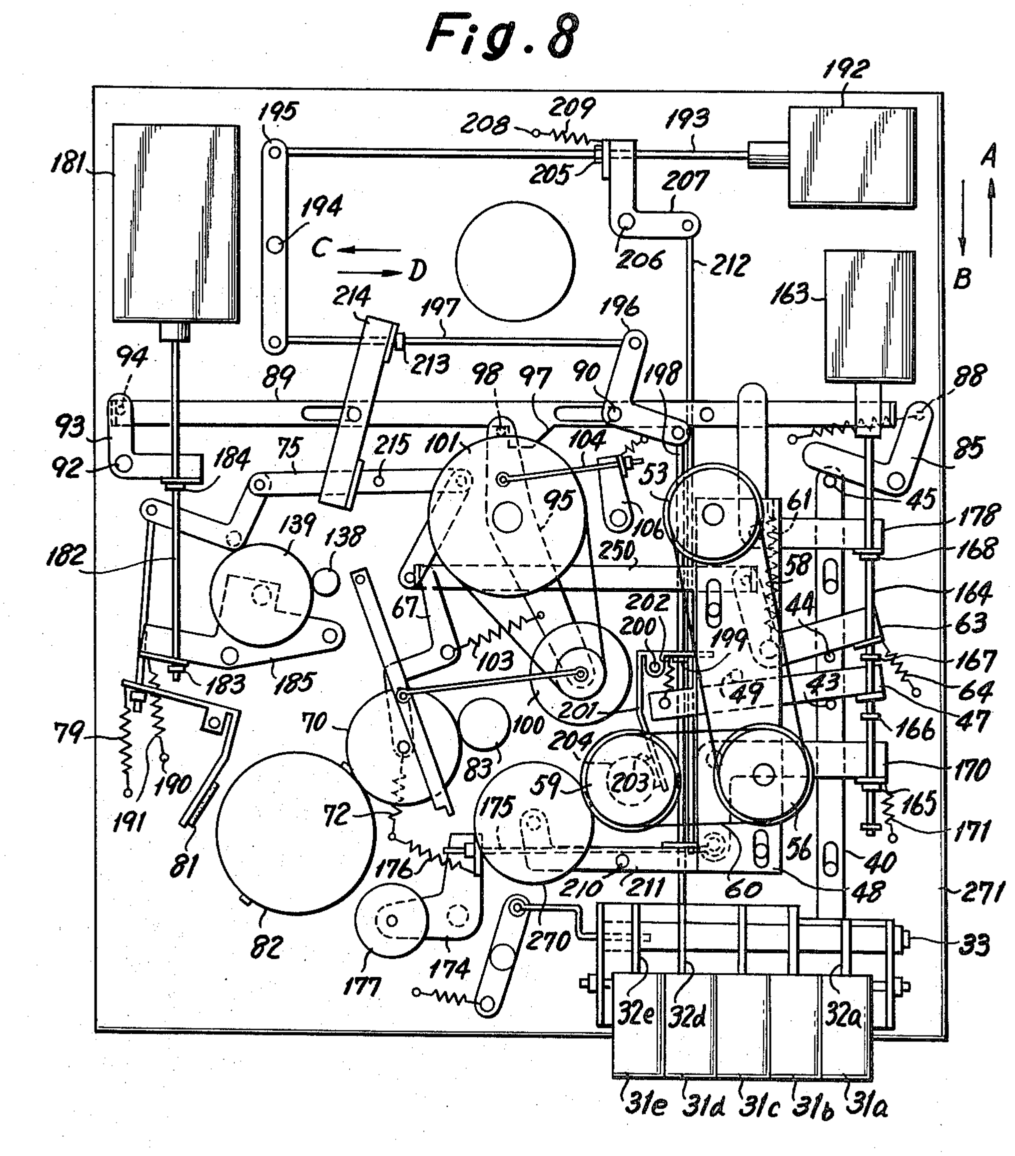

In such state, as the slide lever 40 slides in the direction of arrow A as described above, the pin 44 on the lever 40 also moves in the direction of arrow A. The L-shaped lever 63 engages the pin 44 under the tractive forces of the springs 64, 72 and 79. As the pin 44 slides, the lever 63 revolves in the counterclockwise direction about the shaft 62. Responsive to this revolution of the lever 63, the arm 250 slides in the direction of arrow C. One end of the swing lever 67 is connected to one end of the arm 250 by force of the spring 72, and one end of the swing lever 69 is engaged with the end of the arm 250 by force of the spring 79. The lever 67 is revolved counterclockwise about the shaft 66, by the force of the spring 72, according to the movement of the arm 250 in the direction of arrow C. The idler 70 is thereby compressed against the motor shaft 83, and the reel disk 82 and comes to a position as shown in FIGS.6 to 8. The rotation of the motor shaft 83 is transmitted to the reel disk 82, via the idler 70.

On the other hand, the end of the arm 250 pushes the end of it so that the lever 69 revolves clockwise about the shaft 68. The arm 75 is moved in the arrow D direction. Thus, the L-shaped lever 73 revolves clockwise about the shaft 74 against the force of the spring 79. Brake lever 78 revolves clockwise as it receives the revolving force of the lever 73, acting through the connector 76. The brake shoe 81 thereby leaves the reel disk 82. Therefore, the braking force against the take-up reel is released, whereby the take-up reel rotates.

A pin 45 on the slide lever 40 engages an end of an L-shaped lever 85 which rotates about a shaft 84. A spring 87 is attached between the other end of the lever 85 and the pin 86 provided on the chassis 271. The lever 85 is urged to revolve in the counterclockwise direction by the spring 87, while it is engaged by the pin 45, in the position as shown in FIG.5. The other end of the lever 85 has a pin 88 provided therebelow. A slide lever 89 is capable of sliding in the directions of the arrows C and D guided by a pin 90 provided on the chassis. One end of the slide lever 89 engages the pin 88, and the other end of the lever 89 engages a pin 94 on the lower surface of an end of an L-shaped lever 93 which rotates about a shaft 92.

A swing lever 95 is provided to revolve about a shaft 96. A pin 98 on the lower surface of an end of the swing lever 95, engages a projection 97 on the slide lever 89. A pulley 99 and an idler 100 are integrally connected and rotatably mounted at the other end of the swing lever 95. A pulley 101 is rotatable about the shaft 96. A belt 102 is held between the pulley 101 and pulley 99. The rotation of the idler 100 is transmitted to the pulley 101 through the belt 102. A spring 103 is connected between the shaft 66 and an end of the swing lever 95. The lever 95 always imparts a revolving force of the clockwise direction. As the pin 98 on the other end of the lever 95 engages the projection 97 of the lever 89, the lever 95 is held in the position shown in FIG.5, where the idler 100 is moved away from the motor shaft 83. One end of the swing lever 95 is connected with a connector 104. The other end of the connector 104 is connected to a lever 106 revolvable about a rotary shaft 105. The lever 106 is urged to revolve clockwise by a spring 107. However, as the lever 95 is in engagement as described above, the lever 106 is also engaged in the position as shown. Here, the tractive force of the spring 87 is larger than the sum of tractive forces of the springs 103 and 107 so that the lever 89 is held in the position as shown.

Figure 16A:
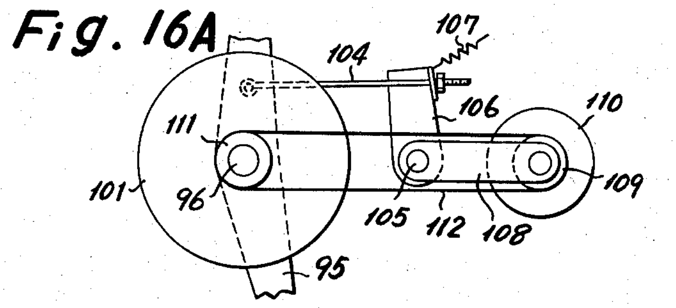
FIGS.16A and 16B are respectively plan views of a tape feeding mechanism.
Figure 16B:
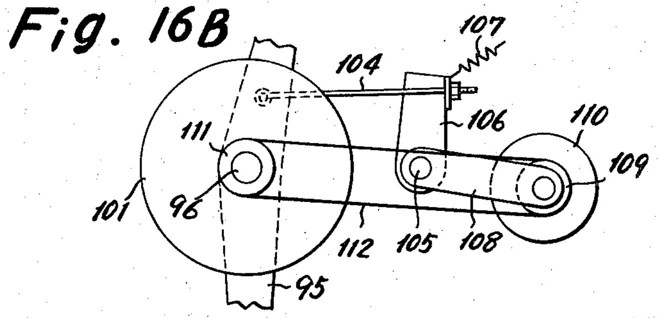

The rotary shaft 105 rotates integrally with the swing lever 106. A feed roller holder 108 is provided above the rotary shaft 105 as shown in FIGS.16A and 16B. The holder 108 revolves about and with the rotary shaft 105. A pulley 109 and a feed roller 110 are coaxially and integrally rotatable and provided on the other end of the holder 108. A pulley 111 is mounted on the shaft 96 of the swing lever 95. The pulley 111 revolves integrally with the pulley 101, mounted coaxially therewith. A belt 112 is held between the pulleys 111 and 109. The rotation of the pulley 111 is transmitted to the feed roller 110 through a belt 112. The holder 108, rotary shaft 105 and lever 106 can revolve integrally. A spring 109 gives the swing lever 106 a clockwise revolving force to turn it about the rotary shaft 105. Since the pin 98 on the lever 95 is in engagement with the projection of the slide lever 89, the swing lever 106 and rotary shaft 105 are held in the position as shown in FIGS.5 and 16A by force of the spring 87.

In this connection, if the play button 31*a* is depressed and the slide lever 40 slides in the direction of arrow A, the pin 45 on the slide lever 40 also moves in the arrow A direction. Thus, the L-shaped lever 85 rotates clockwise against force of the spring 87 and about the shaft 84. By a clockwise revolution of the lever 85, the slide lever 89 is moved in the direction of arrow D by the force of the springs 103 and 107. The L-shaped lever 93 revolves clockwise about the shaft 92. Also, the projection 97 on the slide lever 89 moves in the direction of arrow D, and the lever 95 revolves clockwise responsive to the force of the springs 103 and 107 about the shaft 96. Thus, the idler 100 is moved against the motor shaft 83.

Simultaneously, the swing lever 106, rotary shaft 105 and feed roller holder 108 are turned clockwise about the rotary shaft 105 by force of the spring 107. The feed roller 110 (FIG.16) also revolves and advances in the direction of arrow B. The roller 110 fits into the cartridge 10, through the opening 16, and is pressed against the outermost periphery of the magnetic tape winding 27. The rotation of the motor shaft 83 is transmitted through the idler 100 and pulley 99 to the belt 102, and then transmitted through the pulleys 101 and 111 to the belt 112, and further to the pulley 109 and feed roller 110. Leaders 114 and 115 (FIG.12) are taken out of the cartridge 10 from the tape winding 27 responsive to the rotation of the roller 110. Tape leaders 114 and 115 are fed from the tape winding 27 to the outside of the cartridge 10 by the rotation of the roller 110.

Figure 3:
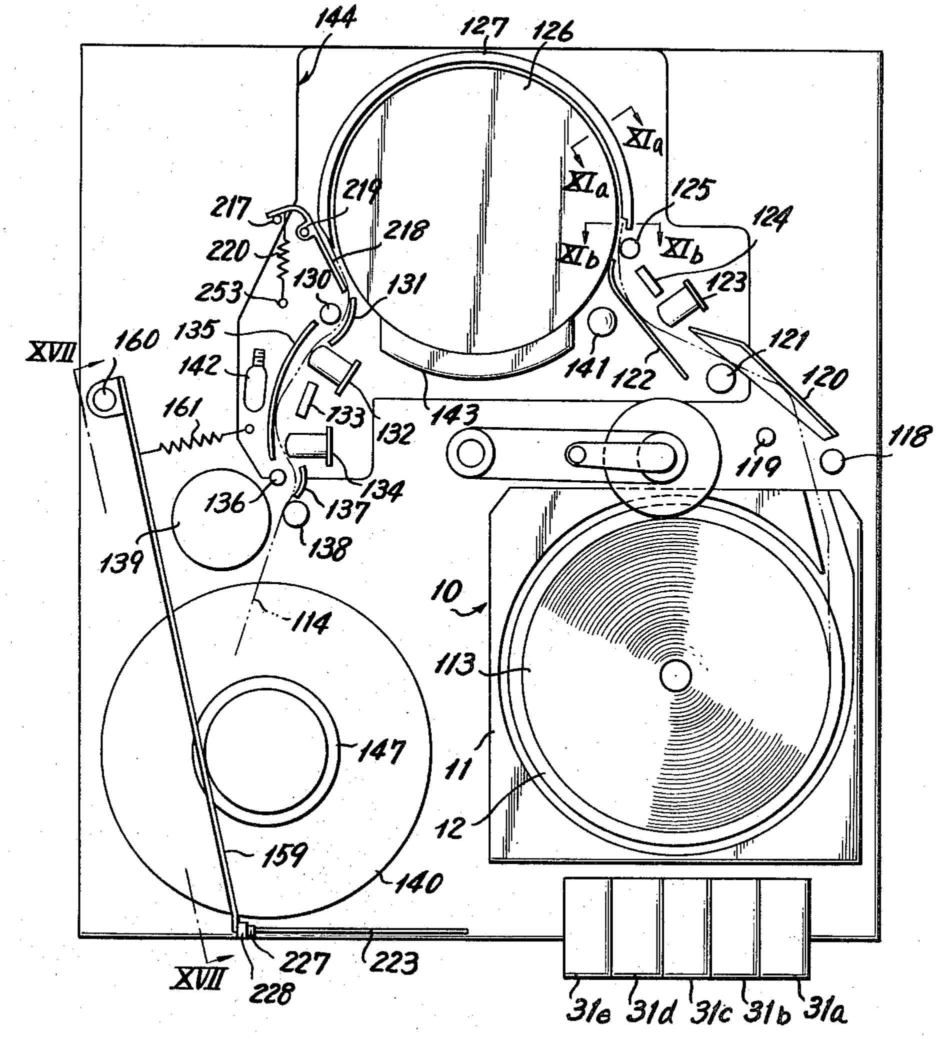
FIG.3 is a plan view of an embodiment of an apparatus according to this invention in an automatic loading mode.
Figure 4:
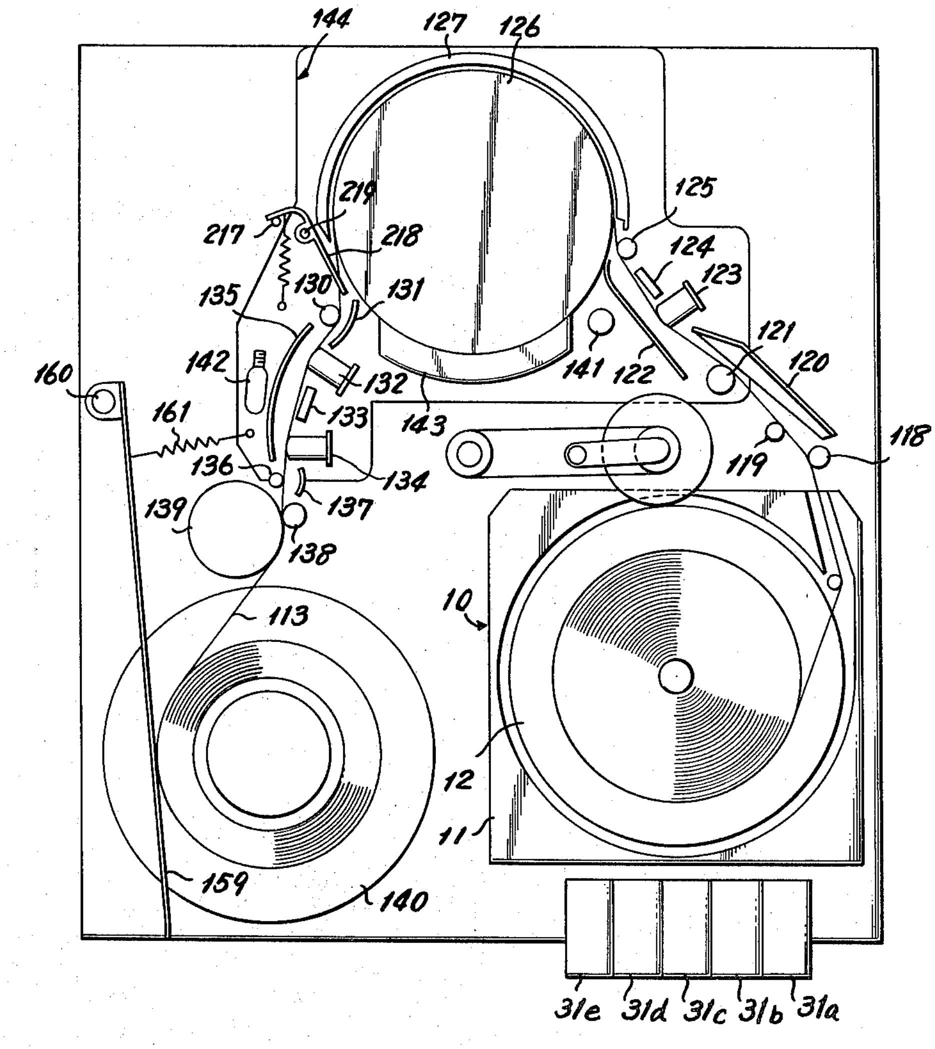
FIG.4 is a plan view of the apparatus shown in FIG.3 in a recording and reproducing mode.

Referring to FIGS.3 and 4, the travelling of the tape in the auto-threading mode is now described. As described above, the first leader 114 is fed from the supply reel 12, in the cartridge 10, by means of the roller 110. It passes between a tension pole 118 and guide pole 119. Thereafter, the leader 114 is guided by a guide plate 120. The leader 114 passes by a guide pole 121, between a transparent guide plate 122, erase head assembly 123, first photocell 124, and it is guided by a guide plate 122. The leader 114 further passes between a guide pole 125 and a guide drum 126 containing rotary magnetic heads (not shown) which record and reproduce the video signal. The leader 114 fits into a leader guide 127.

The leader guide 127 is mounted obliquely with respect to the head scanning surface on the guide drum 126. The tape passes along the semi-circle of the drum, with slight interspace between the guide 127 and drum 126. The entrance of the leader guide 127 is formed in the shape as shown in FIG.11B. The portion succeeding to the leader entrance of the leader guide 127 has a path 128 and opening 129, as shown in FIG.11A, being formed in a somewhat C-shape in section. There is a relationship, $l_1<L_1<l_2<L_2$, between width $L_2$ of the path 128, width $L_1$ of the opening 129 and the width $l_2$ of the first leader 114, width $l_1$ of the second leader 115. In accordance with this relationship, the leader 114 advances into the path 128 from the entrance of the leader guide 127. The second leader 115 has the width $l_1$ smaller than the width $L_1$ of the opening 129. As the leader 114 advances in the leader guide 127, it moves out of the opening 129 and contacts the guide drum 126. The tape 113 following the leader 115 does not enter the leader guide 127, but it is in direct contact with the guide drum 126.

The first leader 114 which comes out from the leader guide 127 is guided to a tape guide plate 131. The leader 114 passes between the guide plate 131 and a guide pole 130, second erase head assembly 132, second photocell 133, control signal and audio signal recording and reproducing head assembly 134 and transparent tape guide plate 135. Further, the leader 114 passes between the sensing pole 136 and tape guide plate 137, capstan 138 and pinch roller 139. Thereafter, the leader 114 reaches to an automatic take-up reel 140. Lamps 141 and 142 respectively illuminate the first photocell 124 and second photocell 133. A drum holder 143 holds the upper and lower drums of the guide drum 126. Here, numeral 144 denotes the drum assembly in entirety.

AUTOMATIC TAKE-UP REEL

The automatic take-up reel 140 is now described with reference to FIGS. 13 and 14. A reel hub 147 is provided between the upper and lower reel flanges 145 and 146 of the take-up reel 140. On the reel hub 147, recesses 148 and 149 are provided. Grooves 150 and 151 are provided at the upper and lower parts on the peripheral surface of the hub 147, except at a projecting part 152. Swingable pawls **152*a* and 152*b* are revolvably mounted on shafts 153*a* and 153*b*. Springs 155*a* and 155*b* are provided between the bases of the swingable pawls 152*a* and 152*b* and pins 154*a* and 154*b*. The pawls 152*a* and 152*b* are always urged to revolve clockwise. In the figure, the pawl 152*a* has its tip end projecting outwardly of the hub 147 responsive to the force of the spring 155*a*. The take-up reel 140** rotates in this condition.

The first leader 114 is fed out of the cartridge 10, threaded through a predetermined path in the apparatus as illustrated with reference to FIG.3, until it reaches to the take-up reel 140. The transparent first leader 114 enters between the upper and lower flanges 145 and 146 of the rotating reel 140. The pawl tip portion of the swingable pawl 152 enters the slot 116 of the first leader 114 and engages with the leader. The take-up reel 140 has a rotation speed which is higher than that of feeding of the leader 114. The pawl **152*a* easily catches the leader 114, in its engagement with slot 116 and takes it up. After engagement between the pawl 152*a* and the leader 114, the leader 114 is positively taken up by the take-up reel 140**.

Figure 13:
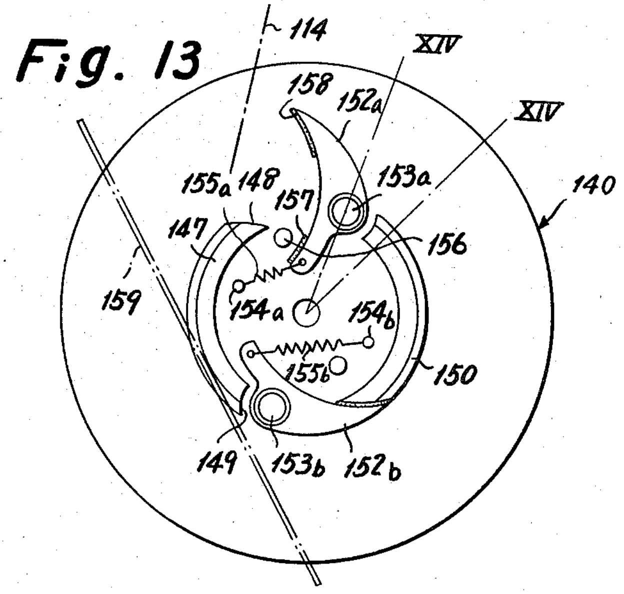
FIG.13 is a plan view of an automatic take-up reel used in the apparatus of this invention, the upper flange of the reel being taken away.
Figure 14:
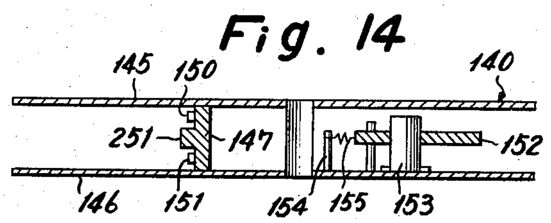
FIG. 14 is a vertical sectional view taken along the line XIV—XIV of the automatic take-up reel shown in FIG. 13.

Furthermore, the pawl **152*a* receives shock in the clockwise direction in FIG.13, when it engages with the leader 114. A resilient member 157 is attached by adhesion at the position where the base of the pawl 152 engages with the pin 156. A similar resilient member 158 cemented on the pawl tip portion of the pawl 152 which enters the slot 116 of the leader 114. Accordingly, the shock of catching the leader is dumped by the resilient materials 157 and 158 and the damage for the leader 114** is prevented.

When the pawl **152*a* engages with the leader 114 amd makes nearly one rotation, the tip end of the pawl 152*a* again makes contact with the leader 114. However, there is no slot at the contacted position of the leader 114. The pawl 152*a* revolves counterclockwise against the force of the spring 155*a* responsive to the winding pressure of the leader 114. The pawl 152*a* is retracted into the hub responsive to its engagement with the leader 114. Therefore, the resilient member 158 on the pawl contacts the recessed surface 148 of the hub 147. In this position, the pawl 152*a* has a retracted configuration of same circumference to that of the reel hub 147. FIG. 13 illustrates this retracted condition with respect to the pawl 152*b***.

Figure 17:
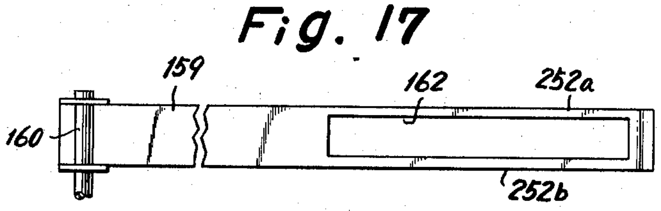
FIG.17 is a plan view of a tape detecting lever.

Tape detecting lever 159 as shown in FIGS.3, 4, 13 and 14 can turn about a shaft 160. The lever 159 is urged always to revolve counterclockwise, by a spring 161. The lever 159 is formed to have a long slot 162 as shown in FIG.17. The slot 162 is dimensioned to receive the projection 152 of the reel hub 147. Upper and lower frames **252*a* and 252*b* of the lever 159 can fit against the grooves 150 and 151. The lever 159 is in a state as shown in FIG.3 before the leader is wound on the reel 140. As the reel 140 takes up the leader and the tape, the lever 159** contacts the outer periphery of the tape winding as shown in FIG.4.

As above described, the leader 114 fed out from the cartridge 10 is auto-threaded along a predetermined tape path in the apparatus. The leader 114 is automatically caught by the automatic take-up reel 140. Thereafter, the leader is positively taken up by rotation of the reel 140 and thereby transported.

FAST FORWARDING MECHANISM IN A LEADER TAKING-UP MODE

The tape 117 cemented to the leader 114 interrupts the light which passes to the first and second photocells 124 and 133. The tape 117 interrupts the light of the lamps 141 and 142. Then, the photocell 124 gives a signal cooperation with the tape 117, but the photocell 133 does not give a signal with the tape 117. The photocell 133 is so constructed that it gives a signal only when its light is interrupted for a relatively long time by means of the tape 113. Here, the distance from the end of the first leader 114 to the light interruption tape 117 is preferably selected to be slightly larger than the distance from the first photocell 124 to the take-up reel 140, in the travelling path of the tape. When the leader 114 passes between the first photocell 124 and the lamp 141 and the tape 117 reaches between the lamp 141 and the photcell 124, the end of the leader 114 is already wound on the take-up reel 140.

In this condition, if the light to photocell 124 is interrupted, a power source is connected to energize the solenoid of a fast forwarding plunger 163 as later described. Therefore, the plunger 163 is operated, and an operating rod 164 is pulled in the direction of arrow A. The operating rod 164 has engaging members 165, 166, 167 and 168 fixed thereto, as shown in FIGS. 5 to 10. An L-shaped lever 170, which revolves about a shaft 169, has one end engaged with an engaging member 165 by force of a spring 171. The spring 171 is suspneded between the pin 172 on the chassis and the lever 170. The lever 170 is thus urged to revolve in the clockwise direction responsive to the spring 171. The other end of the lever 170 and an end of an L-shaped lever 174 (pivoted about the shaft 173) are connected together by a connector 175. The lever 174 is provided with a spring 176 suspended between its end and the pin 71. A fast forwarding roller 177 is rotatable attached on the other end of the lever 174.

The lever 174 is urged by the tractive force of the spring 176 to revolve in the counterclockwise direction. However, the counterclockwise revolution of the lever 174 is restricted by the connector 175. The lever 170 connector 175 and lever 174 are normally in the position as shown in FIG.5, respectively urged by forces of the springs 171 and 176. However, when the fast forwarding plunger 163 operates and the engaging member 165 is slid in the direction of arrow A, by the operating rod 164, the lever 170 revolves counterclockwise against the force of the spring 171. The connector 175 thereby moves in the direction of arrow D, and the lever 174 revolves clockwise. The fast forwarding roller 177 presses against the reel disk 82. This reel disk 82 comprises upper and lower reel disks having felt or the like resilient member interposed therebetween. The idler 70 is constructed so as to press against the lower reel disk. In the recording and reproducing mode as well as in the threading mode, the rotation is transmitted from the lower reel disk to the upper reel disk through the above resilient member. On the other hand, the fast forwarding roller 177 is pressed to the upper reel disk and simultaneously to the lower reel disk. The upper reel disk rotates integrally with the lower reel disk. Therefore, the take-up reel 140 rapidly rotates and takes up the leaders 114 and 115 under the fast forwarding condition.

The engaging member 166 is fixed on the operating rod 164 and moves in the direction of arrow A, by the action of the fast forwarding plunger 163. However, as shown in FIG.6, the lever 47 is revolved in the counterclockwise direction, about the shaft 46, when the play button 31*a* is depressed. Therefore, the engaging member 166 will not revolve the lever 47. In case the play button 31*a* is not depressed, the lever 47 is revolved as described above. The rewinding roller 52 is moved in the direction of arrow A and released from the compression against the reel flange.

The engaging member 167 of the operating rod 164 similarly shifts in the arrow A direction, by the action of the plunger 163. However, as shown in FIG.6, the lever 63 is revolved counterclockwise about the shaft 62, when the play button 31*a* is depressed. Consequently, the lever 63 is not revolved again. Further, when the play button 31a is not depressed, the engaging member 167, secured to the operating rod 164, revolves the lever 63 counterclockwise. The member compresses the idler 70 against the motor shaft 83 and reel disk 82, as above described, so as to detach the brake shoe 81 from the reel disk 82.

Similarly, by action of the fast forwarding plunger 163, the engaging member 168 shifts in the direction of arrow A. A lever 178, an end of which is engaged with the engaging member 168, revolves counterclockwise about a shaft 179. The other end of the lever 178 engages a pin 180 which is uprightly mounted on the slide lever 89. The slide lever 89 moves in the arrow C direction, from the position shown in FIG.6, to the position shown in FIG.7. Therefore, the idler 100 and feed roller 110 perform an action which is reverse to the above described action. The feed roller is moved away from the motor shaft 83, as well as from the outermost periphery of the tape winding on the supply reel. That is, when the slide lever 89 moves in the direction of the arrow C, away from the position shown in FIG.6, the projection 97 slides in the similar way. Thus, th pin 98 causes the swing lever 95 to turn counterclockwise, against force of the springs 103 and 107. Then, the idler 100 is moved away from the motor shaft 83. By a counterclockwise revolution of the swing lever 95, the swing lever 106 acts through the connector 104 counterclockwise against the force of the spring 107. In consequence, the feed roller holder 108 (which is adapted to revolve integrally with the lever 106) revolves counterclockwise. Thus, the feed roller 110 leaves the cartridge 10. This condition is shown in FIG.7. The idler 100 is moved away from the motor shaft 83 by the L-shaped lever 178, much more than in the stop mode as shown in FIG.5. The feed roller 110 is thus placed at a position removed from the tape winding 27 of the supply reel.

PLAY MECHANISM AND PLAY MODE

As hereinabove described, the first leader 114 and second leader 115 at the forward end of the magnetic tape 113 pass by the lamp 142. Thereafter, the tape 113 passes between the lamp 142 and the second photocell 133, as shown in FIGS.3 and 4. The light from the lamp 142 is interrupted, and the second photocell 133 is energized. Consequently, the power source is disconnected from the fast forwarding plunger 163, and it is released as later described. Play plunger 181 is energized by its power source circuit and it operates. As later described, the first photocell 124 turns off even through the tape 113 comes in.

If the fast forwarding plunger 163 releases the operating rod moves in the direction of arrow B under the force of the springs 171 and 64, as shown in FIG.8. By movement of the operating rod 164, the engaging member 165 similarly moves in the direction of arrow B. The L-shaped lever 70 revolves clockwise under the force of the springs 171 and 176. Through the connector 175, the L-shaped lever 174 revolves counterclockwise. The fast forwarding roller 177 is moved away from the reel disk 82 to be in the condition shown in FIGS.5, 6 and 8 away from the condition shown in FIG.7. In the similar way, the engaging members 166 and 167 move in the direction of arrow B. However, by a depression of the play button 31*a*, the slide lever 40 is slid in the direction of arrow A. Thus, the swing lever 47 and L-shaped lever 63 will not be revolved by the pins 43 and 44, provided upright on the lever 40. As a result, the rewinding roller 53 leaves the reel flange of the supply reel and the idler 70 is pressed against the motor shaft 83 and reel disk 82. The brake shoe 81 leaves the reel disk 82 and is in the position, as shown in FIG. 6.

With the fast forwarding plunger 163 released, the engaging portion 168 moves in the direction of arrow B. The swing lever 95 revolves clockwise about the shaft 96 under the force of the springs 103 and 107. The pin 98 (provided underneath the lever 95) pushes th projection 97, in the direction of arrow D, so that the slide lever 89 moves in the arrow D direction. The lever 89 then slides to the position where its end engages the pin 88 underneath the L-shaped lever 85. It is in the position as shown in FIG.6. In this condition, the idler 100 is pressed against the motor shaft 83. The feed roller 110 then advances to the position where it presses against the outermost periphery of the tape winding 27, in which all of the leader and tape are wound on the supply reel 12. Since the first leader 114, second leader 115 and a portion of the tape 113 have been taken out already from the supply reel 12, the roller 110 will not make with contact the outer periphery of the tape winding. Simultaneously with this, the fast forwarding plunger 163 releases so that the play plunger 181 is operated. As later described, the feed roller 110 does not substantially advance into the cartridge 10.

When a power circuit of a play plunger 181 is closed and the play plunger 181 is actuated as described above, an operating rod 182 of the plunger moves in the direction of arrow A. Engaging members 183 and 184, fixed at the operating rod 182, moves in the similar way. A pinch roller lever 185 revolves about a shaft 189. The pinch roller lever 185 makes contact at its end with the engaging member 183. A spring 191 is connected between the pinch roller lever 185 and a pin 190 provided on the chassis 271. The other end of the lever 185 is attached the pinch roller 139 rotatably attached thereto. The lever 185 is urged to revolve counterclockwise under the force of the spring 191. While the revolution of the lever 185 is limited by the engaging member 183, the lever 185 is in the position as shown in FIGS.5, 6, 7 and 9. The pinch roller 139 is detached from the capstan 138. Here, by operation of the plunger 181, the engaging member 183 moves in the direction of arrow A, and as shown in FIG.8, causes the lever 185 to revolve clockwise against force of the spring 191. The pinch roller 139 is pressed against the capstan 138. Also, the movement of the engaging member 184 in the arrow A direction revolves the lever 93 in the counterclockwise direction. The slide lever 89 slides by force applied to the pin 94 in the arrow C direction.

The movement of the slide lever 89 in the arrow C direction makes the projection 97 push the pin 98 in the arrow C direction. Thus, the swing lever 95 revolves counterclockwise, so that the idler 100 is detached from the motor shaft 83. Also, responsive to the revolution of the lever 95, a force is transmitted through connector 104 revolving the swing lever 106 and feed roller holder 108 counterclockwise. Therefore, the feed roller 110 comes out from the tape cartridge 10. Thus, the apparatus is placed in the play mode as shown in FIG.8. The tape 113 is held by the capstan 138 and pinch roller 139, then driven forward to the take-up reel 140, for recording or reproducing.

REWINDING MECHANISM AND REWINDING MODE

An electroconductive sensing tape (not shown) is cemented to the end of the magnetic tape 113. The sensing tape has a length which is longer than the interspace between the sensing pole 136 and the guide pole 130. When the recording or reproducing are performed and the sensing tape reaches the sensing pole 136, the power source circuit is disconnected from the play plunger 181 is opened by the detected signal detected by the sensing pole 136. Thus, the plunger 181 is released. A rewinding plunger 192 is connected to its power source circuit and operated.

If the play plunger 181 is released, the operative rod 182 moves in the direction of arrow B under the force of spring 191. By movement of the operating rod 182 in the arrow B direction, the engaging member 183 moves in the same direction. In consequence, the pinch roller lever 185 revolves counterclockwise under the force of the spring 191. The pinch roller 139 thus leaves the capstan 138. Similarly, the engaging member 184 moves in the arrow B direction. The slide lever 89 moves in the arrow D direction under the force of the springs 103 and 107 until its end engages with the pin 88. The other end of the slide lever 89 has been in engagement with the pin 94, on the upright below the L-shaped lever 93, so that the lever 93 is revolved clockwise about the shaft 92.

By movement of the slide lever 89 in the arrow D direction, the swing lever 95 is revolved clockwise. The idler 100 is pressed against the motor shaft 83. Also, the feed roller holder 108 revolves clockwise and the feed roller 110 advances into the cartridge 10. Almost simultaneously, as the plunger 181 releases, the rewinding plunger 192 is energized from its power source circuit, and it actuates. Simultaneously, the following operation is carried out.

By operation of the rewinding plunger 192, an operating rod 193 moves in the arrow D direction. The other end of the operating rod 193 is connected with a swing lever 195 which is revolvable mounted on a shaft 194. The other end of the lever 195 has a connection 197 for transmitting force to an end of an L-shaped lever 196 mounted on the shaft 90. A connector 198 is connected integrally between the rewinding lever 32*d*, controlled by the rewinding button 31*d*, and the other end of the lever 196. By a counterclockwise revolution of the lever 196, the rewinding button 31*d* is adapted to move downwardly through the connector 198. The rewinding lever 32*d* has the same construction as the play lever 32*a*. With the projection of the lever 32*d* provided at a position slightly shifted from the projection 36 of the lever 32*a*, the play lever 32*a* is readily released from its locking and the rewinding lever 32*d* is closed.

The connector 198 has an engaging member 199 (FIG.8) fixed thereto. A spring 202 is connected between the shaft 46 and an end of a brake lever 201 of the L-shape bracket which is swingable about a shaft 200. The lever 201 is urged to revolve in the clockwise direction. As one end of the lever 201 is in engagement with the engaging member 199, the lever 201 has been restricted in its clockwise revolution. In this circumstance, a brake shoe 203 on the other end of the brake lever 201 is pressed against an idler 204 integral and coaxial with the pulley 59 and imparts a braking force to the idler 204.

An engaging member 205 is fixed to the operating rod 193 of the rewinding plunger 192. A spring 209 is held between an end of an L-shaped lever 207 which is revolvable about a shaft 206 and a pin 208 provided on the chassis. The lever 207 receives a rotating force in the counterclockwise direction under the urging of the spring 209 and engaged to the engaging member 205 at a position as shown in FIGS.5 to 8. A connector 212 is connected between the other end of the lever 207 and an end of a swing lever 211 which is swingable about a shaft 210. The other end of the swing lever 211 has an idler 270 which is rotatably mounted thereon. The idler 270 is pressed against the motor shaft 83 and idler 204 (as shown in FIG.9) when the swing lever 211 revolves clockwise about the shaft 210. The idler 270 is thus adapted to be moved against or away from the motor shaft 83 and idler 204, by a revolution of the swing lever 211.

When the rewinding plunger 192 operates, the operating rod 193 moves in the arrow D direction, whereby the swing lever 195 revolves clockwise about the shaft 194. The L-shaped lever 196 receives a rotating force transmitted through the connector 197 and revolves counterclockwise about the shaft 90. Accordingly, the connector 198 moves in the arrow A direction. Thus, the engaging member 199, fixed at the connector 198, similarly moves in the arrow A direction. The brake lever 201 revolves counterclockwise against force of the spring 202 and is released from braking against the idler 204. By movement of the connector 198 in the direction of arrow A, the rewinding lever 32*d* revolves counterclockwise as seen in FIG.10 (not shown in FIG. 9) about the shaft 33 and the mechanism is locked in a state wherein the rewinding button 31*d* is depressed. At the same time, the play button 31*a* is released from its locking position by the spring 35 as shown in FIG.10 and the button 31*a* is raised upwardly. By clockwise revolution of the play button 31a in FIG.10, the slide lever 40 moves in the arrow B direction under the force of the springs 61. 64 and 87, so that an operation reverse to the operation of threading mode is performed.

Namely, the pin 43 on the slide lever 40 moves in the arrow B direction and the slide plate 48 moves in the arrow B direction under the force of the spring 61. At this instant, the pin 49 revolves the swing lever 47 in the clockwise direction. Consequently the rewinding roller 52 which is rotatably mounted on the shaft 54, advances into the cartridge 10 and presses against the flange of the supply reel 12. As the pin 44 on the slide lever 40 moves in the arrow B direction, the L-shaped lever 63 revolves in the clockwise direction under the force of the spring 64, by which the arm 250 is moved in the arrow D direction. Due to movement of the arm 250 in the arrow D direction, the swing lever 67 revolves clockwise against force of the spring 72, so that the idler 70 is moved away from the motor shaft 83 and reel disk 82. The take-up reel 140 does not receive the rotation force from the motor shaft 83. Through the action of the plunger solenoid 192, a lever 214 is revolved counterclockwise by an engaging member 213 which is fixed on the connector 197. On the other hand, at its other end, the lever 214 is in contact with a pin 215 of the arm 75. Therefore, the brake shoe 81 is detached from the reel disk 82 and moved against force of the spring 79 (as shown in FIG.9) by revolution of the lever 214.

Further, the action of the rewinding plunger 192 moves the engaging member 205 in the arrow D direction, which action revolves the L-shaped lever 207 in the clockwise direction. The connector 212 is moved in the arrow B direction. The movement of the connector 212 in the arrow B direction causes the swing lever 211 to revolve clockwise to press idler 204 against the motor shaft 83. The rotational force of the motor shaft 83 is transmitted to the idler 270 and idler 204, which has been released from braking. The rotation of the idler 204 is transmitted, through the pulley 59 integrally rotatable with the idler 204, belt 60, pulley 57, pulley 56 which is integrally rotatable with the pulley 57, belt 58, and pulley 53, to the rewinding roller 52 which is integrally rotatable with the pulley 53. Here, the rewinding roller 52 has been pressed against the flange of the supply reel 12 in the cartridge 10, so that the rewinding of the tape is performed by rotation of the roller 52.

TAPE REWINDING

A travelling of tape during the rewinding mode is now described below. The swing lever 195 shown in FIGS.5 and 9 has an arm 216 fixed thereon. An end of the arm 216 is provided with a pin 217. The pin 217 revolves in an arc centered about the shaft 194 responsive to the the revolution of the swing lever 195. A guide panel 218 mounted near the periphery of the guide drum 126 as shown in FIGS.3 and 4 is revolvably mounted on the shaft 219. A spring 220 is held between an end of the guide panel 218 and pin 253 on the chassis of the drum assembly. The panel 218 is always urged to revolve counterclockwise responsive to the spring 220, but it is engaged with the pin 217 on the arm 216 (FIG. 5).

Figure 18:
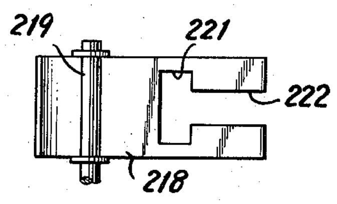
FIG.18 is a plan view of a guide panel.

When the rewinding plunger 192 operates and the swing lever 195 revolves, the pin 217 similarly revolves clockwise about the shaft 194. The guide panel 218 revolves counterclockwise under the force of the spring 220. The forward end of the panel 218 (FIG.3) crosses the travelling path of the tape and moves in a direction close to the guide drum. The forward end of the panel 218 is formed in a C-shape similar to the cross section of the leader guide 127 as shown in FIG.18 and has a large opening 221 of a width $L_2$ and a small opening 222 of a width $L_1$. In the rewinding mode of tape, the end of the guide panel 218 is pressed by small force against the rewinding tape. Thus, when the magnetic tape 113 passes the entire panel portion 218 and the second leader 115 of a narrow width reaches it, the leader 115 of the width $l_1$ enters in the opening 221 of the large width from the opening 222 and passes along the opening 221.

Accordingly, as the first leader 114 reaches panel 218, followed by the leader 115, the leader 114 into the opening 221 (FIG.18) of the large width and enters the path 128 of the leader guide 127 (FIG.27). Then, the first leader 114 is all rewound on the supply reel 12 through the path 128 without contacting the guide drum 126. Therefore, the first leader 114 which is relatively hard is rewound without contacting the rotary magnetic head.

CARTRIDGE REJECTION

The described rewinding thus has been ended, and the entire tape is rewound from the take-up reel 140. Frames 252*a* and 252*b* (FIG.17) at the forward end of the tape detecting lever 159, as shown in FIGS.3, 4, 13, 14 and 17, enter into the slots 150 on the reel hub 147 of the take-up reel 140. A rod 223 (FIG.3) is thereby moved by sliding to the arrow D direction (FIG.5).

As shown in FIG.5, a rod 226 is connected to other end of a swing lever 225 which is swingable about a shaft 224 and having an end connected to the rod 223. The swing lever 225 is urged to revolve in the clockwise direction by the force of a spring 254. An engaging plate 228 (FIG.5) an engaging member 227 fixed at the rod 223. Because of this, the swing lever 225 (FIG.5) is restricted of its revolution. An auto-stop switch 229 for rewinding use is switched on or off by the revolution of the swing lever 225.

With the progress of the rewinding of the tape from the take-up reel 140, the tape detecting lever 159 (FIG.3) revolves counterclockwise about the shaft 160, responsive to the force of the spring 161. The lever 159 enters into the slot 150 of the reel hub 147, when the tape has run out of the take-up reel 140. By the entry of the detecting lever 159 into the slot 150, the rod 223 moves in the arrow D direction (FIG.5). Thus, the swing lever 225 revolves, about the shaft 224 counterclockwise against force of a spring 254. The auto-stop switch 229 is switched off by the lever 225. The rewinding action is therefore stopped as later described. On the other hand, by revolution of the swing lever 225 in the counterclockwise direction, the rod 226 moves in the arrow C direction. The forward end of the rod 226 moves out of the path of the reject lever 32e, which is swingably mounted on the shaft 33 (FIG.10) below the reject button 31*e*. While the tape is taken up on the take-up reel 140, the reject button 31*e* may not be depressed, so that the cartridge 10 cannot be taken out of the apparatus. However, as the rod 226 moves in the arrow C direction, the reject button 31*e* can be depressed. Thus, by depression of the button 31*e*, the cartridge 10 can be taken out of the apparatus by a known method.

CARTRIDGE LOCKING MECHANISM

A cartridge locking mechanism is now described below. Generally, the tape or leader is damaged when the cartridge 10 is taken out of the apparatus even if the tape or leader is wound up on the take-up reel. In the apparatus of this invention, a locking mechanism is included to prevent the depression of the reject button 31*e* for rejecting the cartridge when the tape or leader are wound on the take-up reel.

Figure 19:
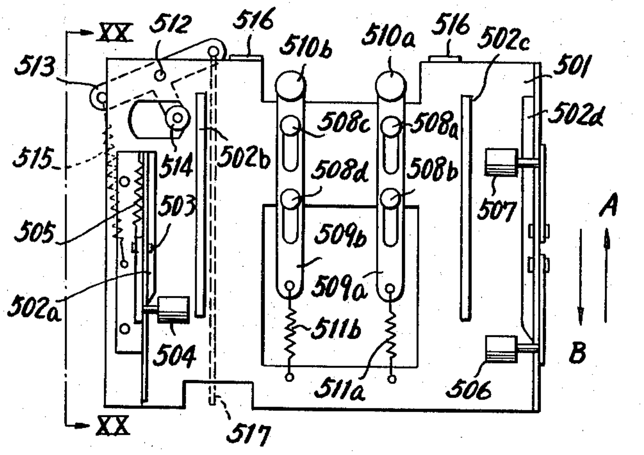
FIG.19 is a plan view of a cartridge loading table.
Figure 20:
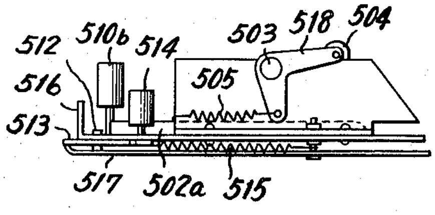
FIG.20 is a side view viewed from the line XX—XX of FIG.19.

The cartridge 10 is inserted into the cartridge loading table as shown in FIG.19, along guide plates 502*a*–502*d* fixed to a bracket 501. Then, a roller 504, which is rotatably mounted at an end of an L-shaped lever 518 swingable about a shaft 503, revolves counterclockwise (FIG.20) against the force of a spring 505. The roller 504 pushes the cartridge 10 downwardly by the force of the spring 505. Rollers 506 and 507 have the same construction as the roller 504 so as to serve the same object.

After the cartridge 10 is inserted, the forward end of the cartridge 10 engages with rollers 510*a* and 510*b*. The rollers 510*a* and 510*b* are rotatably mounted at the ends of slide levers 509*a* and 509*b*, respectively which slide by guidance of pins 508*a* – 508*d* on the bracket 501. The slide levers 509*a* and 509*b* are moved in the arrow A direction against the force of springs 511*a* and 511*b*. By the advance of the cartridge 10, the forward end of the cartridge engages with a roller 514 which is rotatably mounted at an end of a T-shaped lever 513 that is swingable about a shaft 512. The forward end of the cartridge 10 revolves the T-shaped lever 513 clockwise against the force of a spring 515. The cartridge 10 further advances, and its end engages with an engaging portion 516 projecting from the bracket 501, and then the cartridge 10 is stopped in its advance. At this instant, the roller 514 fits into the recess 26 on the cartridge 10, as shown in FIGS.1 and 2, roller 514 being moved by the force of the spring 515. Thus, the cartridge 10 is locked in the cartridge loading table when the cartridge 10 is completely inserted thereinto.

Since the tape has been caught and wound up on the take-up reel 140, the tape detecting lever 159 revolves in the clockwise direction. The rod 223 moves in the arrow C direction under the force of the spring 254. As the result, the rod 226 enters the path of the reject lever 32*e*. Therefore, the reject button 31*e* cannot be depressed.

As the tape has been rewound and the tape is not present on the take-up reel 140, an operation reverse to the above operation is now performed. The rod 226 retires from the path of the reject lever 32*e*. The reject button 31*e* can be depressed. A connector 517 connects an end of the T-shaped lever 513 to an end of the reject lever 32*e*. The connector 517 is moved in the arrow B direction responsive to the revolution of the reject lever 32*e* by depression of the reject button 31*e*. Thus, the T-shaped lever 513 revolves clockwise about the shaft 512. The roller 514 is retracted from the recess 26 of the cartridge 10. With the revolution of the roller 514, the rollers 510*a* and 510*b* slide in the arrow B direction responsive to the forces of the springs 511*a* and 511*b*. The cartridge 10 is thus rejected and taken out from the cartridge insertion opening of the cartridge loading table.

ELECTRIC CIRCUIT SYSTEM

Figure 15:
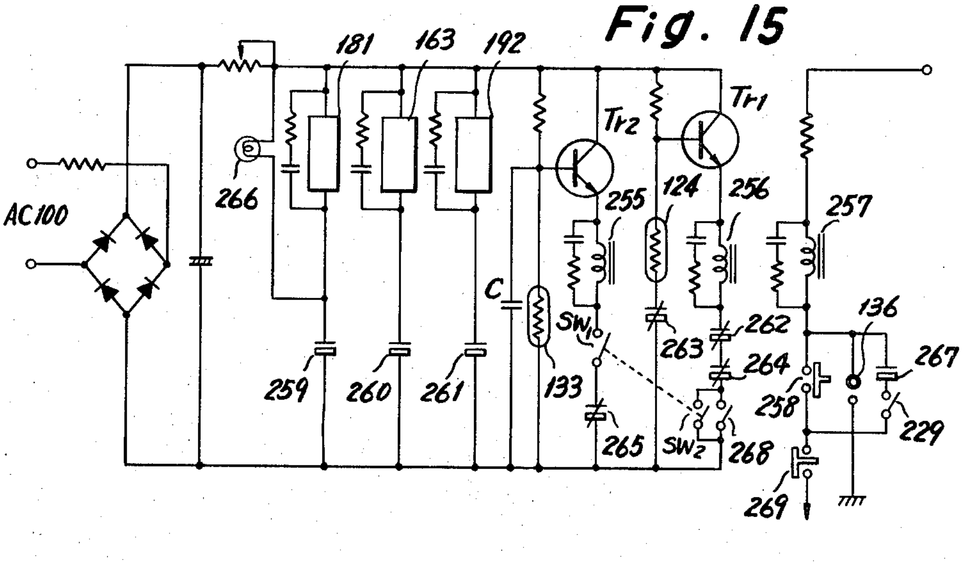
FIG. 15 is a circuit diagram of an embodiment of an electric circuit in the apparatus of this invention.

An electric circuit system of this invention is now described with reference to FIG.15. When the play button 31*a* is depressed, the rewinding roller 52 moves away from the supply reel flange and retracts from the cartridge 10, as above described. On the other hand, the take-up reel 140 revolves and the feed roller 110 advances into the cartridge 10. The roller 110 presses against the outermost periphery of the tape winding 27 and moves the first leader 114 out of the cartridge 10. By the depression of the play button 31*a*, *switches* $SW_1$ and $SW_2$ are placed in their on-states. At this instant, the photocells 124 and 133 are inoperative. The play relay 255 and fast forwarding relay 256 will not operate. Also, the autostop switch 229. sensing pole 136 and rewinding switch 258 (associated with the rewinding button 31*d*) are opened, so that the rewinding relay 257 is released. Thus, switches 259–261 which correspond to contacts of relays 255–257, respectively, are opened. The respective plunger solenoid 181, 163 and 192 therefore do not operate.

When the first leader 114, which is fed by the feed roller 110 to advance into the apparatus and the light interrupting tape 117 cemented on the leader 114 moves between the lamp 141 and the first photocell 124, the light of the lamp 141 is interrupted. As a result, the base voltage of a transistor $Tr_1$ rises, and the transistor $Tr_1$ is placed in conductive state. Switches 262 and 264 respectively correspond to the contacts of play relay 255 and rewinding relay 257. These switches are closed when the respective relays are released and opened by operation of each relay.

The switches 262 and 264 are closed, and a switch $SW_2$ is also closed. With the transistor $Tr_1$ being switched on, the fast forwarding relay 256 operates in response to the interruption of the light, of short duration. By the operation of the fast forwarding relay 256, a contact 263 of the fast forwarding relay is opened, so that the base voltage of the transistor $Tr_1$ rises sufficiently to hold transistor $Tr_1$ in an on condition. Thus, the transistor $Tr_1$ is held in the self-locking condition. Even though the tape 117 passes away from between the lamp 141 and the photocell 124 and the photocell 124 again receives the light and its resistance value reduces, the fast forwarding relay 256 continues in its self-holding operation since the contact 263 is already opened.

By a further advance of the tape, and upon the passage of the tape 117 between the lamp 142 and the second photocell 133, the tape 117 interrupts the light from the lamp 142 falling on the photocell 133. The base of transistor $Tr_2$ is connected to a capacitor C, and the tape 117 is sufficiently short, thus the light is interrupted by the tape 117 for only a short period of time. Furthermore, the time constant of electric charge in the capacitor C is adequately selected. Before the base voltage of the transistor $Tr_2$ rises high enough to switch on the transistor $Tr_2$, the tape 117 passes away from the front of the lamp 142 and stops the interruption of the light. Although the switch $SW_1$ is closed, and a switch 265 as the contact of the rewinding relay is closed, the play relay 255 does not operate.

By operation of the fast forwarding relay 256, the switch 260 of the fast forwarding relay is closed, and the plunger solenoid 163 is operated. By the operation of the plunger 163, the apparatus enters the fast forwarding mode to start the fast forwarding operation of the tape. Thus, the feed roller 110 retracts from the cartridge 10. The driving of the tape is not effected by the feed roller 110, but the fast forwarding roller 177 rotates the upper and lower reel disks 82 of the take-up reel 140 altogether. The take-up reel 140 is already engaged with the tape. Then, the tape is positively driven and run by the rotation of the take-up reel 140.

The tape is moving in the fast forward mode and driven by the positive rotation of the take-up reel 140. The magnetic tape 113 moves between the lamp 142 and second photocell 133. Therefore, the light from the lamp 142 is interrupted by the tape 113. The interruption of the light is longer in duration than the interruption of light by the interruption tape 117. When the electric charging of the capacitor C is accomplished, a current flows in the second photocell 133, which is raised in the resistance value. The base voltage of the transistor $Tr_2$ rises and the transistor $Tr_2$ switches on. The switch $SW_1$ is closed by a depression of the play button 31*a*. The contact 265 of the rewinding relay 257 is closed, because the rewinding relay is released. With the transistor $Tr_2$ on, a current flows to the play relay 255 for operation.

As the play relay 255 operates, its switch 259 is closed, and the play plunger solenoid 181 is operated. On the other hand, the switch 262 is opened by the action of the play relay 255, so that the fast forwarding relay 256 is released. Also, the switch 260 of the fast forwarding is opened and releases the fast forwarding plunger 163.

In this manner, the play mode is started. A play mode indication lamp 266 lights to indicate the starting of the play mode. In the play mode, the fast forwarding roller 177 moves away from the upper and lower reel disks of the take-up reel 140 as described above. The pinch roller 139 is pressed against the capstan 138. Thereafter, the capstan 138 makes the tape run.

Thus, the recording or reproducing functions are performed, and the electroconductive sensing tape cemented to the end of the magnetic tape 113 reaches the sensing pole 136. The circuit connected to the sensing pole 136 receives ground potential, so sensing pole 136 is closed and earthed to ground, so that the rewinding relay 257 operates. A contact 267 of the rewinding relay 257 is closed by operation of the rewinding relay. The auto-stop switch 229 is closed by an engagement and rewinding of the first leader 114, on the take-up reel 140. As the result, the rewinding relay 257 continues to be in its operated condition, after it is self-locked and the sensing tape leaves the sensing pole 136. The contact 265 is opened by an operation of the rewinding relay 257, and the play relay 255 releases. As the play relay 255 releases, the switch 259 of the play relay 255 is opened. The play plunger 181 becomes inoperative. The play indication lamp 266 is switched off. Thus, the apparatus is released from the play mode.

By operation of the rewinding relay 257, the switch 261 is closed, and the rewinding plunger 192 is operated. The apparatus enters the rewinding mode. In this rewinding mode, an idler 270 is pressed to the motor shaft 83 and to idler 204, as described above. The rotation of the motor shaft 83 is transmitted through the pulleys 59, 57, 56 and 53, belt 60 and 58 to the rewinding roller 52. Also, the rewinding roller 52 is pressed against the supply reel flange in the cartridge 10. Accordingly, the supply reel 12 is rotated in the rewinding direction effecting the tape rewinding.

Even after the tape is rewound and the sensing tape passes the sensing pole 136, the rewinding relay 257 is self-locked, so that it is still operated. Although the tape is further rewound and the leaders 115 and 114 and tape 117 pass by the photocells 133 and 124, the contacts 264 and 265 of the rewinding relay 257 are opened so that the rewinding is still continued.

As the tape is rewound and the first leader 114 is released from its engagement with the take-up reel 140, the tape detecting lever 159 revolves counterclockwise about the shaft 60. The rod 223 is then rotated in the arrow D direction. Thus, the auto-stop switch 229 is opened and the rewinding relay 257 releases. The switch 261 also is opened. The rewinding plunger solenoid 192 releases. Thus, the rewinding mode is ended, and the apparatus switches to the stop mode. Throughout the above described modes, the tape loading, fast forwarding, recording or reproducing, rewinding and stopping are all performed automatically. For operation, the switch 268 is connected to the fast-forwarding button 31*b*, switch 258 to the rewinding button 31*d*, and switch 269 to the stop button 31*c*, respectively. In each mode as described, the depression of the corresponding button causes operation of a desired mechanical and electrical mode.

MECHANICAL SKEW CONTROL MECHANISM

Figure 21:
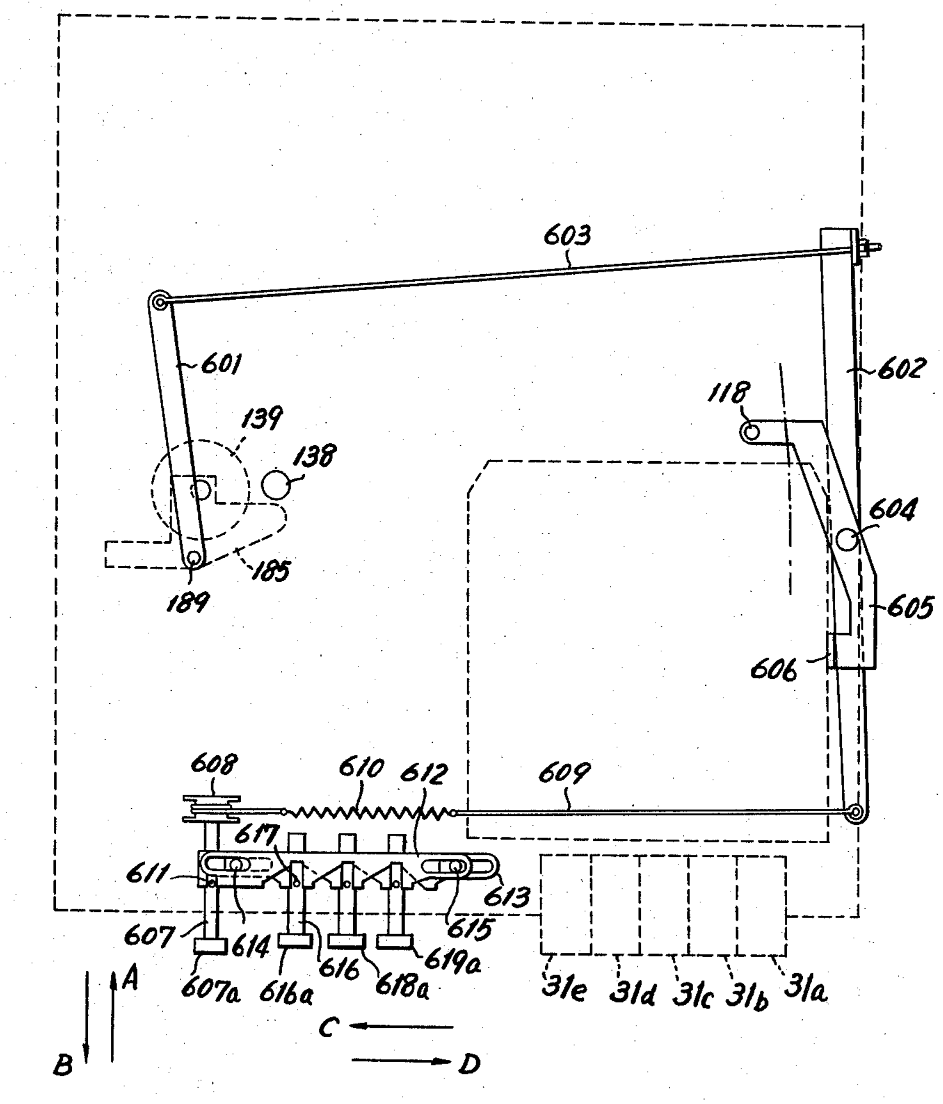
FIG.21 is a plan view of an embodiment of a mechanical skew control means.

A mechanical skew control mechanism is described with reference to FIGS.21 and 22. The mechanism can mechanically remove the influence of the skew control, when the recording is made after skew control in the reproducing mode.

In the recording or reproducing mode, the pinch roller lever 185 revolves clockwise about the shaft 189 by the above described operation. The pinch roller 139 is thus pressed against the capstan 138. By the revolution of the pinch roller lever 185, a lever 601 is similarly revolved clockwise about the shaft 189. The revolution of the lever 601 is transmitted through a connector 603 which extends from the levers 601 and 602 to a swing lever 602. The lever 602 thus revolves clockwise about a shaft 604. A tension lever 605 has a tension pole 118 at an end thereof and a brake shoe 606 at a projecting part on the other end thereof. The tension lever 605 is adapted to revolve about the shaft 604 integrally with the swing lever 602. By a clockwise revolution of the swing lever 602, the brake shoe 606 revolves in the clockwise direction. The tension pole 118 contacts the tape or leader. The brake shoe 606 advances through the opening 25 and into the cartridge 10 so as to contact the reel flange. The tension pole 118 detects the tension of the tape. The detected output adjusts the compression force of the brake shoe 606 against the reel flange, and thus it constitutes a mechanical servo system.

A connector 609 extends between the other end of the swing lever 602 and a pulley 608 fixed at the shaft 607. A portion of the connector 609 is formed with a spring 610. A knob 607*a* is turned for skew control. The pulley 608 is revolved whereby the swing lever 602 is revolved responsive to motion imparted by the connector 609. At the same time, the tension lever 605 is revolved, so that the braking of the brake shoe 606 for the reel flange is adjusted, and the skew control is performed.

Figure 22:
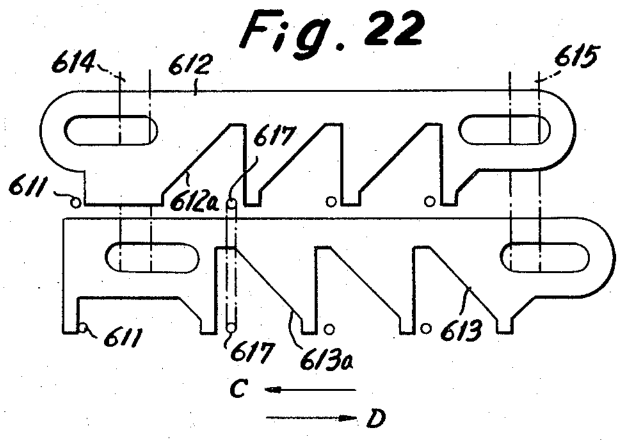
FIG.22 is an enlarged plan view of a lever of the mechanism shown in FIG.21.

The shaft 607 has a pin 611 which engages cam plates 612 and 613 as shown in the exploded plan view of FIG.22. The two cam plates 612 and 613 are closely positioned above and below, to slide in the arrows C and D directions (in the FIG.22 responsive to the force of guide pins 614 and 615. By a rotation of the knob 607*a*, the pin 611 revolves in the similar fashion. If the knob 607*a* is turned clockwise to adjust the skew in the reproducing mode, the cam plate 612 is pushed by the pin 611 to slide in the arrow D direction. The turning of the knob 607*a* is limited by guide pins 614 and 615.

The next description refers to the circumstance in which the above skew control is made in the reproducing mode, and thereafter the recording is performed. The button 616*a* is mounted at the forward end of the lever 616, for video and audio signals recording. When the button 616*a* is pressed in the arrow A direction and the play button 31*a* is pressed downwardly, the video and audio signals recording is carried out. A pin 617 is attached uprightly on the lever 616. When the button 616*a* is depressed and the lever 616 slides in the arrow A direction, the pin 617 slides in the same way. By this movement of the pin 617, the pin 617 contacts and pushes the inclined portions 612*a* and 613*a* of the cam plates 612 and 613. The cam plates 612 and 613 slide in directions reverse to the above directions. Namely, the cam plate 612 slides in the arrow C direction, and the cam plate 613 slides in the arrow D direction, respectively. Thereafter, the cam plates 612 and 613 are returned to the initial position. A button 618*a* is a button for recording only audio signals and a button 619*a* is a button for the temporary stopping at the time of recording. The construction and operation of these buttons 618*a* and 619*a* are, respectively the same as those of the button 616*a*.

According to the construction of the mechanism, the skew control can be automatically released at the time of recording to perform the recording, in a constant manner.

TAKE-UP REEL STOP POSITION SETTING MECHANISM

The take-up reel rotates at a high speed before the leader or tape is caught. Accordingly, its forward end is often damaged when the leader or tape is caught by the take-up reel. Problems occur since the leader end is repelled and pushed in the direction of outer periphery of the reel, and an accurate taking-up can not be started. These problems are overcome by the following mechanism of this invention.

Through FIGS.5 to 9, a lever 702 is swingable about a shaft 701 and is connected through a connector rod 703 to the shaft of the pulley 99, on which the lever 95 is mounted. A projection 704 is provided on the outer periphery of the upper reel disk 82 at position that it will not engage the fast forwarding roller 177 as it is moved to or removed from the upper and lower reel disks.

As hereinabove described, the swing lever 95 is swung in the counterclockwise direction, except when the leader is in the threading mode. The idler 100 is moved away from the motor shaft 83. At this instant, the lever 702 is moved to the position after where it has revolved counterclockwise about the shaft 701. The forward end of the lever 702 is moved away from the reel disk 82. The take-up reel rotates in the recording, reproducing and rewinding modes, and stops responsive to the braking force of the brake shoe 81 in the stop mode.

When the leader is threading, the swing lever 95 revolves clockwise. The idler 100 presses against the motor shaft 83. Then, the lever 702 swing clockwise about the shaft 701, responsive to forces applied through a connector 703. The forward end of the lever 702 engages with a projection 704 provided on the upper reel disk 82. As the result, a rotational forces of the motor shaft are transmitted through the idler 70 to the lower reel disk. Due to engagement of the lever 702 with the projection 704, the upper reel disk does not rotate. The take-up reel 140 stops at a predetermined position of rotation. Therefore, the take-up reel 140 stops at a position which allows the pawl 152*a* or 152*b* to easily catch the advancing leader. The stop position of this reel 140 is established by the position of the projection 704.

As soon as the leader end reaches the take-up reel 140, the lever 702 is revolved counterclockwise about the shaft 701. The forward end of the lever 702 is disengaged from the projection 704. The take-up reel 140 starts its rotation. Thus, the engagement of the leader is positively performed. In case the mechanism of this embodiment is not used, the light interrupting tape 117 is cemented at a position spaced away from the foward end of the leader by a distance equal to the length of winding of a one round from the photocell 124 to the take-up reel 140. However, in the mechanism of this embodiment, the tape 117 is cemented at a position which is spaced away from the leader end by a length extending from the photocell 124 to the position where the tape is taken up by the pawl of the take-up reel 140.

In the above embodiment, a sensing means may be provided by a combination of a sensing tape and a sensing pole, instead of a combination of the lamps 141 and 142 and photocells 124 and 133. Also, instead of means for sensing by a direct cooperation between the tape or leader, there may be means for operating in response to an elapse of time spent in forwarding the leader by a predetermined length and indirectly detecting the forwarding of the leader, in a predetermined length.

A means is provided for operating the take-up reel in the fast-forwarding mode, when the leader is forwarded in a predetermined length and caught by the automatic take-up reel. Another means may also be used for detecting the engagement of the leader with the reel. This means used a microswitch operable by a pawl in the take-up reel, instead of an optical detecting means, as described, for detecting the predetermined length of the leader.

In the above embodiment, the automatic take-up reel 140 is stopped at a position such that the pawl 152*a* (or 152*b*) can easily engage the leader 114. When the leader 114 advances to the reel 140, in the direction passing outside of the reel hub 147 (or 150), the forward end of the pawl 152a seldomly repels the leader 114, even if the reel 140 starts rotation from the position where the leader 114 can easily engage the slot 116 of the leader 114.

Figure 23:
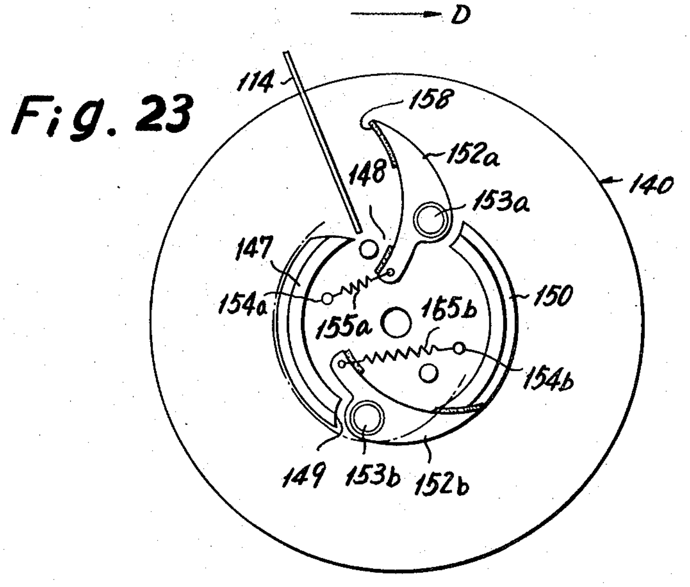
FIG.23 is a plan view of the automatic take-up reel showing an example of a stop position.

The following is a description of a preferable embodiment. The pawl 152*a* stops the reel 140 at the position where the pawl 152*a* does not repel the leader 114. The mechanism is the same as above described. The automatic take-up reel 140 is stopped at the position as shown in FIG. 23. That is, the take-up reel 140 stops at the position where the recess 148 (or 149) on the reel hub 147 is directed to the leader 114. The leader 114, which has been guided along the predetermined path by the leader guide means, advances into the reel hub 147 from the recess 148 of the reel hub. At this instant, the pawl 152*a* is revolved outwardly to the position where the advance of the leader 114 into the hub 147 is not obstructed.

As described above, the leader 114 advances into the reel hub 147 from the recess 148, whereupon the take-up reel 140 starts its rotation by an operation similar to that described above. By rotation of the reel 140, the pawl 152*a* engages the slot of the leader 114. When the pawl 152*a* engages the leader 114 and makes one rotation, the pawl 152*a* is pushed, responsive the winding pressure of the leader 114, to the outer periphery, and takes a position as shown in FIG. 23 with respect to the pawl 152*b*. When the pawl 152*a* engages the leader 114, the forward end of the leader 114 enters into the reel hub 147. The pawl 152*a* does not repel the leader 114 and never fails to engage with the leader The invention is not limited to the above described embodiments. Various changes and modifications can be made without departing from the spirit and scope of the invention.

What we claim is:

1. An automatic tape loading type magnetic recording and reproducing apparatus which comprises: a supply reel , a tape with a flexible leader provided at the forward end of said tape wound on said reel, means for feeding said leader from said supply reel, means for guiding the leader fed by said feeding means along a predetermined path in said apparatus, means comprising an automatic take-up reel for automatically engaging and taking up said leader which is guided by said guide means, first detecting means for detecting the feeding of a leader of a predetermined length from said supply reel, means for stopping said feeding means responsive to an operation of said first detecting means, means for positively rotating said automatic take-up reel responsive to operation of said first detecting means , said take-up reel positively taking up the leader engaged by said automatic take-up reel, second detecting means for detecting when all of said leader has been fed and a successive leader is fed, tape driving means comprising a capstan and a pinch roller, and means for operating said tape driving means responsive to operation of said second detecting means and for positively driving said leader and tape.

2. The automatic tape loading type of magnetic recording and reproducing apparatus as defined in claim 1, wherein said means for positively rotating said automatic take-up reel comprises means to quickly rotate said automatic take-up reel in a fast forwarding mode of operation responsive to a signal from said first detecting means.

3. The automatic tape loading type of magnetic recording and reproducing apparatus as defined in claim 1, wherein said leader has a relatively short detecting member located at a predetermined position thereon, means for operating said first detecting means responsive to said detecting member, and means for precluding operation of said second detecting means responsive to said relatively short detecting member.

4. The automatic tape loading type of magnetic recording and reproducing apparatus as defined in claim 1, wherein said magnetic recording and reproducing apparatus includes means comprising a magnetic head portion for recording and reproducing signals on said tape, said first detecting means being located on the tape feeding side relative to said magnetic head portion in a position in the advancing direction of said leader and tape, said second detecting means being located on the tape take-up side relative to said magnetic head portion in the advancing direction of said leader and tape.

5. The automatic tape loading type of magnetic recording and reproducing apparatus as defined in claim 1, wherein said leader comprises a transparent material and a relatively short non-transparent detecting member located at a predetermined position thereon, said first detecting means being a first optical detecting means to detect said detecting member and operate responsive thereto, said second detecting means being a second optical detecting means which is not operated for detecting said detecting member of relatively short passing time and for detecting said non-transparent tape after a long passing time.

6. The automatic tape loading type of magnetic recording and reproducing apparatus as defined in claim 1, wherein the predetermined length of said leader is a length which is at least equal to a predetermined tape path in said apparatus extending from said supply reel to said automatic take-up reel.

7. The automatic tape loading type of magnetic recording and reproducing apparatus as defined in claim 1, wherein said leader has an engaging slot in the vicinity of its forward end, said automatic take-up reel comprises a reel hub having leader engaging pawls swingably mounted therein for extending out of and retracting into said reel hub, said swingable pawls being engageable with the engaging slot of said leader, said automatic take-up reel being constructed to be stopped and to start rotation responsive to operation of said first detecting means, and means for stopping said automatic take-up reel at a position for easily engaging said leader with one of said swingable pawls.

8. The automatic tape loading type of magnetic recording and reproducing apparatus as defined in claim 1, wherein said leader has an engaging slot in the vicinity of its forward end, said automatic take-up reel comprises a reel hub having recesses and leader engaging pawls swingably mounted for movement into and out of recesses in said reel hub, said swingable pawls being engageable with the engaging slot of said leader, means including said automatic take-up reel for stopping and starting rotation responsive to operation of said first detecting means, and means for stopping said automatic take-up reel at a position where the leader guided by said guide means advances into the recess of said reel hub.

9. An automatic tape loading type magnetic recording and reproducing apparatus comprising a supply reel, a tape having a flexible leader connected to the forward end thereof, said tape initially being wound on said supply reel, means for feeding said leader from said supply reel, means for guiding the leader fed by said feeding means along a predetermined path in said apparatus, means comprising a rotating take-up reel for automatically engaging and taking up said leader which is guided by said guide means, a rotating capstan disposed on one side of the predetermined path, a pinch roller disposed on the other side of the predetermined path in a cooperating relationship with said capstan, first detecting means for detecting the feeding from said supply reel of a predetermined length of the leader which extends far enough along said path for the forward end of said leader to reach said take-up reel, means for stopping said feeding means responsive to an operation of said first detecting means, means also responsive to the operation of said first detecting means for speeding up the rotation of said take-up reel to positively take up the leader as it is engaged by said take-up reel, second detecting means disposed at a predetermined place near said predetermined path for detecting a passage of said tape after all of said leader has passed by said predetermined place, means responsive to an operation of said second detecting means for moving said pinch roller to press said leader and tape against said rotating capstan so as to positively drive said leader and tape, and means responsive to said second detecting means for restoring the take-up reel to the original speed of rotation.

10. The automatic tape loading apparatus of claim 9 wherein said leader comprises a transparent material with a relatively short non-transparent detecting member located at a predetermined position thereon, said first detecting means comprising a first light emitting means and a first photocell means positioned on opposite sides of the predetermined path and in face-to-face relationship with each other, means whereby said means for stopping said feeding means is operated by a signal from the first photocell in response to an interruption of the light from said first light emitting means by said non-transparent detecting member, means whereby said means for speeding up the rotation of said take-up reel is operated by a signal from said first photocell in response to the interruption of the light from said first light emitting means, said second detecting means comprising a second light emitting means and a second photocell means disposed on opposite sides of the predetermined path in face-to-face relationship with each other, and means whereby said means for moving said pinch roller to press the leader and tape against said rotating capstan is operated by a signal from said second photocell in response to the interruption of the light emitted from said second light emitting means by the tape, said second photocell signal being recognized by the fact that the tape interrupts the second light emitting means for a period of time which is longer than the interruption period caused by the length of said non-transparent detecting member.

11. An automatic tape loading type magnetic recording and reproducing apparatus comprising:

a. supply reel;
b. a tape with a flexible leader at the forward end of said tape, said tape and leader being wound on said supply reel, said leader having a slot in the vicinity of its forward end;
c. means for feeding said leader from said supply reel;
d. means for guiding said leader along a predetermined path in said apparatus as it is fed by said feeding means;
e. a take-up reel means comprising a reel hub having recesses and pawls for engaging said slot in the leader and thereby catching the leader as it is guided by said guiding means, said pawls being swingably mounted for movement into and out of said recesses;
f. means for engaging said take-up reel to hold it in a stationary state;
g. a rotating capstan means disposed on one side of the predetermined path;
h. a pinch roller means disposed on the other side of the predetermined path in a spaced and cooperating relationship with said capstan;
i. first detecting means for detecting the feeding of a predetermined length of the leader from said supply reel whereby the forward end of said leader reaches said take-up reel;
j. means for stopping said feeding means responsive to an operation of said first detecting means;
k. means responsive to the operation of said first detecting means for disengaging said take-up reel from said engaging means and rotating said take-up reel in a fast forward mode to positively catch the leader and wind up the leader and tape on said take-up reel;
l. second detecting means disposed at a predetermined place near said predetermined path for detecting the presence of said tape after all of said leader has passed by said predetermined place;

m. means responsive to an operation of said second detecting means for moving said pinch roller to press said leader and tape against said rotating capstan so as to positively drive said leader and tape; and n. means responsive to the operation of said second detecting means for slowing down the rotation of said take-up reel to the tape transport velocity of a recording or reproducing mode.

12. The automatic tape apparatus of claim 9 wherein said leader comprises a transparent material having a relatively short non-transparent detecting member located at a predetermined position thereon, said first detecting means comprising first light emitting means and a first photocell means positioned in face-to-face relationship with respect to each other and on the opposite sides of the predetermined path, means whereby said means for stopping said feeding means is operated in response to a photocell signal produced by an interruption of the light passing from said first light emitting means to said first photocell means, said interruption being caused by said non-transparent detecting member, means whereby said means for disengaging said take-up reel is operated in response to the interruption of the light passing from said first light emitting means to said first photocell means, said second detecting means comprising second light emitting means and a second photocell means disposed in face-to-face relationship with respect to each other and on the opposite sides of the predetermined path, and means whereby said means for moving said pinch roller and for said slowing the rotation of said take-up reel is operated in response to the interruption by the tape of the light passing from said second light emitting means to said second photocell means, said tape interruption having a time duration which is longer than the length of said interruption by the non-transparent detecting member passing said predetermined place.

* * * * *